US010582252B2

(12) United States Patent
Watanabe et al.

(10) Patent No.: US 10,582,252 B2
(45) Date of Patent: Mar. 3, 2020

(54) DISPLAY DEVICE, TELEVISION RECEIVER, PROGRAM, AND RECORDING MEDIUM

(71) Applicant: Sharp Kabushiki Kaisha, Sakai, Osaka (JP)

(72) Inventors: Kenji Watanabe, Sakai (JP); Ryosuke Ohmae, Sakai (JP); Shinjiroh Kihara, Sakai (JP); Yoshimune Yashiro, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/753,225

(22) PCT Filed: Jul. 13, 2016

(86) PCT No.: PCT/JP2016/070736
§ 371 (c)(1),
(2) Date: Feb. 16, 2018

(87) PCT Pub. No.: WO2017/038261
PCT Pub. Date: Mar. 9, 2017

(65) Prior Publication Data
US 2018/0242036 A1 Aug. 23, 2018

(30) Foreign Application Priority Data

Aug. 28, 2015 (JP) .................................. 2015-169498
Aug. 28, 2015 (JP) .................................. 2015-169499

(51) Int. Cl.
*H04N 21/431* (2011.01)
*H04N 5/45* (2011.01)
(Continued)

(52) U.S. Cl.
CPC ....... *H04N 21/4316* (2013.01); *G06F 3/0481* (2013.01); *G06F 3/0483* (2013.01);
(Continued)

(58) Field of Classification Search
CPC .. G06F 3/04842; G06F 3/0481; G06F 3/0488; G06F 3/04847; G06F 3/0483;
(Continued)

(56) References Cited

U.S. PATENT DOCUMENTS 5,524,195 A * 6/1996 Clanton, III ............. G09B 5/14
345/173
5,886,697 A * 3/1999 Naughton ............. H04L 12/282
345/473

(Continued)

FOREIGN PATENT DOCUMENTS

| EP | 2 535 809 A1 | 12/2012 |
|----|----|----|
| JP | 2012-231428 A | 11/2012 |
| JP | 2014-082754 A | 5/2014 |

*Primary Examiner* — Cynthia M Fogg
(74) *Attorney, Agent, or Firm* — Keating & Bennett, LLP

(57) ABSTRACT

Easy switching to a display mode that corresponds to a viewing-and-listening style that is desired by a user is enabled. A display device (1) displays one or plural objects on a slidable background and performs switching between a first mode in which display of a target object among the one or plural objects is stopped in a case where the background is slid and a second mode in which the target object is displayed while being fixed to a display region regardless of whether or not the background is slid.

21 Claims, 31 Drawing Sheets

(51) Int. Cl.

| | | |
|---|---|---|
| *H04N 21/443* | (2011.01) | |
| *H04N 21/485* | (2011.01) | |
| *G06F 3/0488* | (2013.01) | |
| *G06F 3/0481* | (2013.01) | |
| *G06F 3/0484* | (2013.01) | |
| *G06F 3/0483* | (2013.01) | |
| *H04N 21/422* | (2011.01) | |

(52) U.S. Cl.
CPC ........ *G06F 3/0488* (2013.01); *G06F 3/04842* (2013.01); *G06F 3/04847* (2013.01); *H04N 5/45* (2013.01); *H04N 21/42224* (2013.01); *H04N 21/4438* (2013.01); *H04N 21/4858* (2013.01)

(58) Field of Classification Search
CPC .... G06F 3/0485; H04N 5/45; H04N 21/4438; H04N 21/4858; H04N 21/42224; H04N 21/4316; H04N 21/4821; H04N 21/4312; H04N 5/272; H04N 5/23238; H04N 19/119; H04N 19/176; H04N 21/23424; H04N 21/23614; H04N 21/4781; H04N 13/279; H04N 21/23412; H04N 5/2224; H04N 5/2259
USPC .......................................................... 725/37
See application file for complete search history.

(56) References Cited

U.S. PATENT DOCUMENTS

| | | | |
|---|---|---|---|
| 2004/0027347 A1* | 2/2004 | Farsaie | ............... H04N 13/221 345/419 |
| 2012/0274728 A1 | 11/2012 | Yasoshima | |
| 2012/0278745 A1 | 11/2012 | Kim et al. | |
| 2015/0256786 A1 | 9/2015 | Katoh et al. | |
| 2015/0309689 A1* | 10/2015 | Jin | ..................... G06F 3/04817 715/765 |

\* cited by examiner (a)

(b)

(a)

(b)

(a)

(b)

(a)

(b)

(c)

DISPLAY DEVICE, TELEVISION RECEIVER, PROGRAM, AND RECORDING MEDIUM

TECHNICAL FIELD

The present invention relates to a display device, a television receiver, a program, and a recording medium.

BACKGROUND ART

In recent years, as a smart TV, a smart TV has been developed to which not only a function to display a TV broadcast video obtained by receiving a broadcast wave but also a variety of functions are added. For example, a smart TV has been developed in which a platform such as Android® is installed and which displays an image obtained by executing an application as a smartphone or a tablet personal computer (PC).

In addition, in recent years, a technique for meeting needs that users desire to view and listen to a TV broadcast video during execution of an application has been developed.

For example, PTL 1 discloses a TV conference device by which during a TV conference, an image of another site and images of shared materials may simultaneously be viewed on the same screen. In this TV conference device, a display unit is divided into a conference application display region and a material sharing display region, a TV conference screen is displayed in the conference application display region, and a material screen is displayed in the material sharing display region.

Further, PTL 2 discloses a technique in which a set top box (also referred to as STB) in which an OS is installed is used in order to add a function like a smart TV to a usual TV and an application executed by the STB and a TV broadcast video are simultaneously viewed and listened to. In this technique, a picture in picture (PinP) function of a TV is used to display an image of the application executed by the STB in a main screen and to display the TV broadcast video in a sub-screen.

CITATION LIST

Patent Literature

PTL 1: Japanese Unexamined Patent Application Publication No. 2012-231428 (laid open on Nov. 22, 2012)
PTL 2: Japanese Unexamined Patent Application Publication No. 2014-82754 (laid open on May 8, 2014)

SUMMARY OF INVENTION

Technical Problem

A user may desire to focus on viewing and listening to TV or may desire to view and listen to TV while using another application, and the viewing-and-listening style that is desired by the user is thus different moment to moment.

Techniques disclosed in PTL 1 and PTL 2 mainly aim at a style of viewing and listening to a TV broadcast video during execution of an application, and there is room for improvement in a viewpoint of flexibly suiting the viewing-and-listening style that is desired by the user.

Accordingly, the present invention has been made in consideration of the above problem, and a first object thereof is to provide a display device, a television receiver, a program, and a recording medium that may easily perform switching to a display mode which corresponds to a viewing-and-listening style that is desired by a user.

Further, in the technique of PTL 1, because a display unit is divided into a conference application display region and a material sharing display region, a material screen (object) may not be displayed in an arbitrary part that is intended by the user, for example.

Further, in the technique of PTL 2, because a display position of an icon (object) used for starting or the like of an application is corrected in a TV such that the icon does not overlap with a TV broadcast video (content), the display position of the icon is changed in a case where the icon is about to overlap with the TV broadcast video. Consequently, the icon is not necessarily displayed in an appropriate part that is intended by the user.

The present invention has been made in consideration of the above problem, and a second object thereof is to provide a technique for appropriately displaying an object in a case where the object is displayed together with a content.

Solution to Problem

To solve the above problem, a display device according to one aspect of the present invention is a display device that displays one or plural objects on a slidable background, in which switching is feasible between a first mode in which display of a target object among the one or plural objects is stopped in a case where the background is slid and a second mode in which the target object is displayed while being fixed to a display region regardless of whether or not the background is slid.

Further, to solve the above problem, a display device according to one aspect of the present invention is a display device that displays the one or plural objects together with a content and that includes an acceptance unit which accepts the operation for expanding or enlarging any of the one or plural object, and a control unit which stops display of the content in a case where at least a portion of the expanded or enlarged object is superimposed on at least a portion of the content.

Advantageous Effects of Invention

One aspect of the present invention enables easy switching to a display mode that corresponds to a viewing-and-listening style which is desired by a user.

Further, one aspect of the present invention provides an effect in which an object may appropriately be displayed in a case where the object is displayed together with a content.

Figure 4:
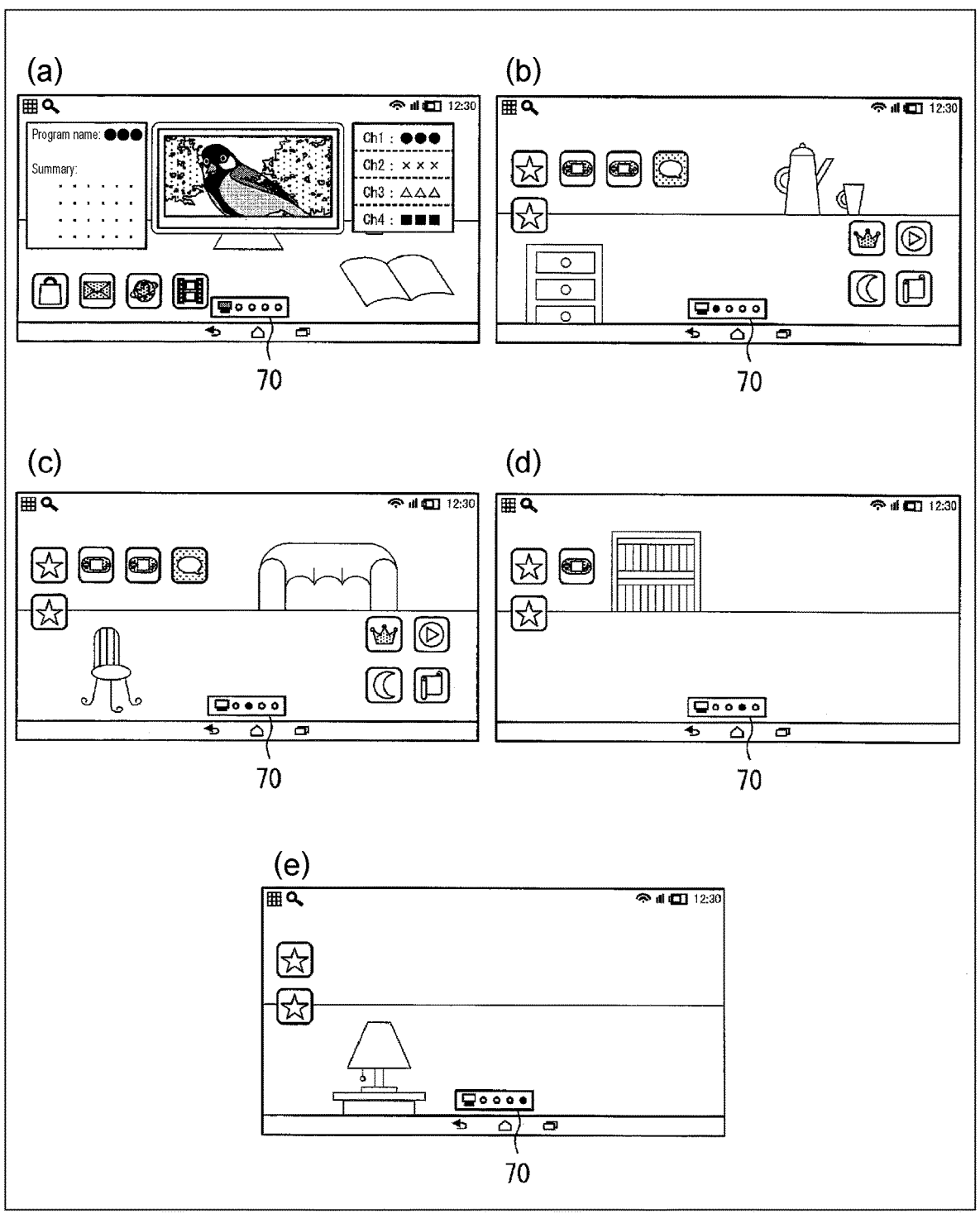

(a) to (e) in FIG. 4 are diagrams that illustrate screen transition examples in a case where a home screen is slid.

Figure 5:
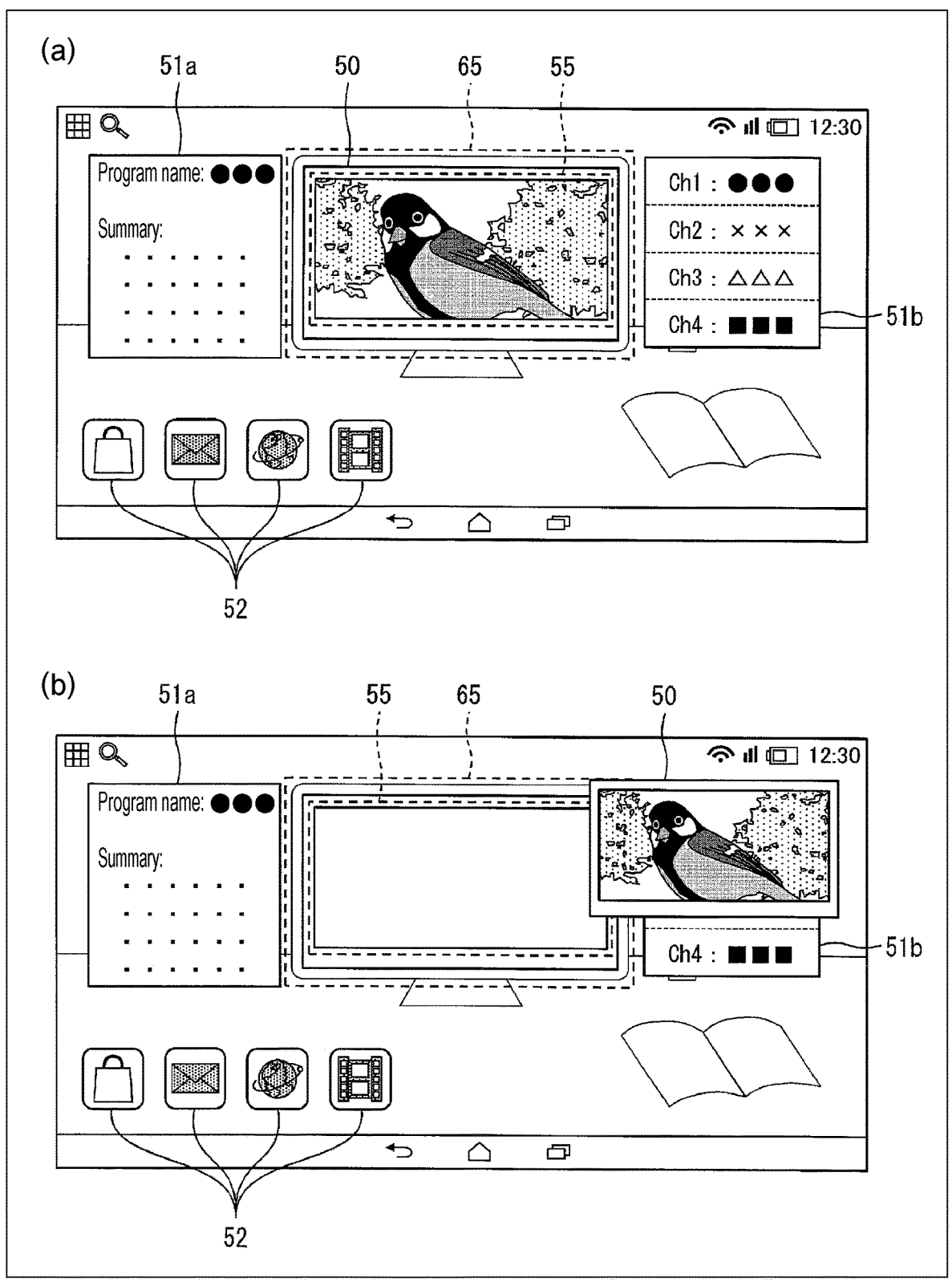

(a) and (b) in FIG. 5 are diagrams that illustrate screen display examples of two display modes according to the first embodiment of the present invention.

Figure 6:
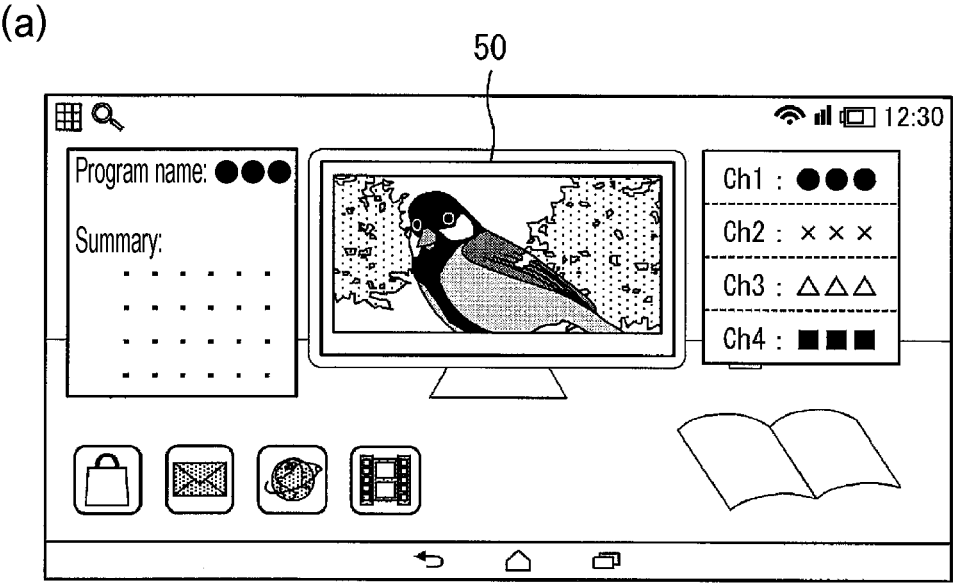
Figure 6:
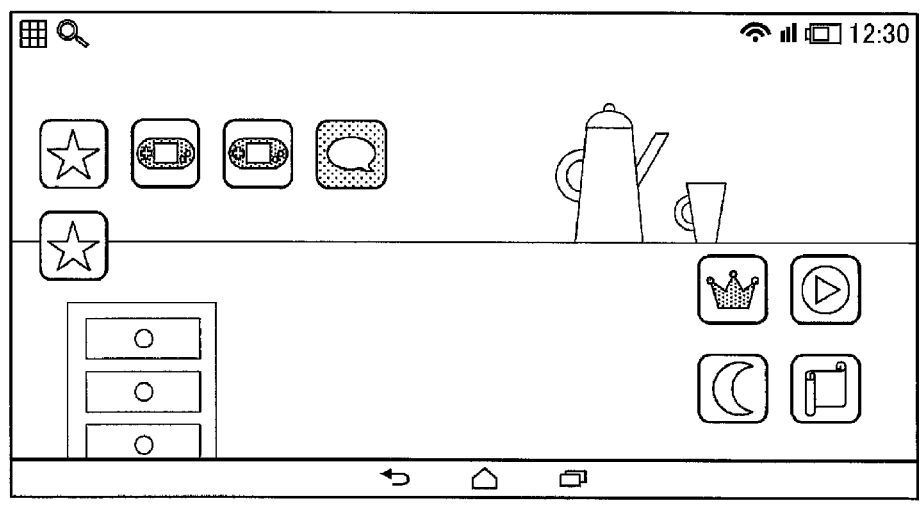

(a) and (b) in FIG. 6 are diagrams that illustrate screen transition examples in a case where a background is slid in a mini-TV home mode according to the first embodiment of the present invention.

Figure 7:
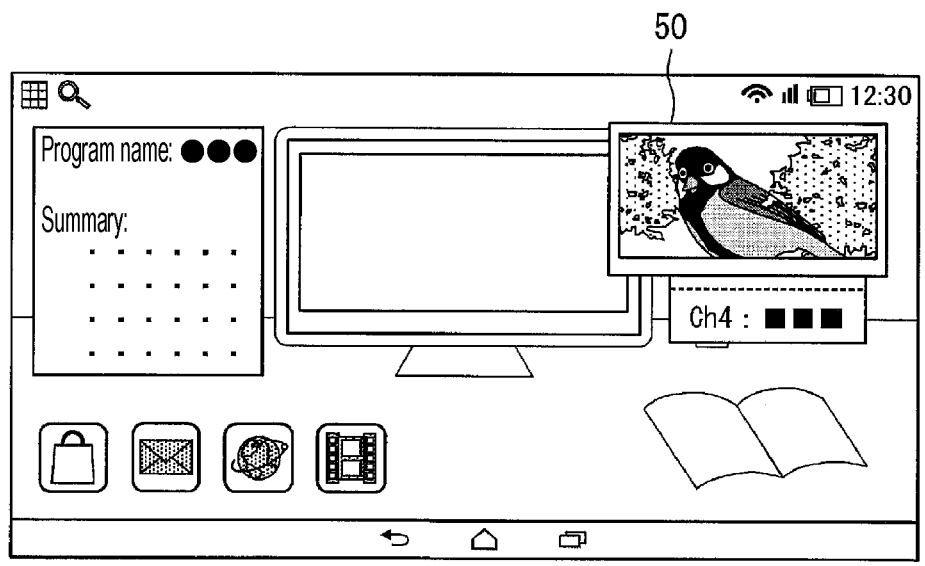
Figure 7:
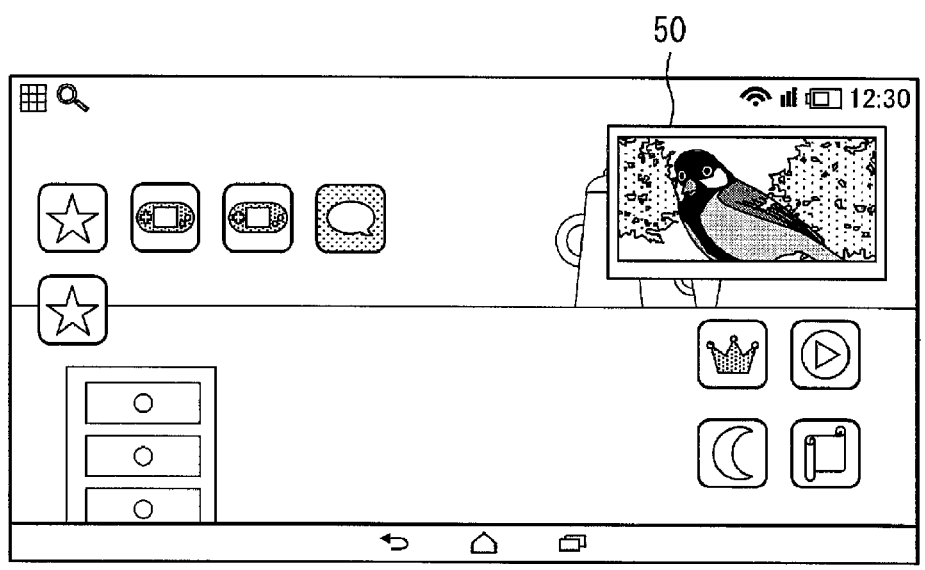

(a) and (b) in FIG. 7 are diagrams that illustrate screen transition examples in a case where the background is slid in a mini-TV free mode according to the first embodiment of the present invention.

Figure 8:
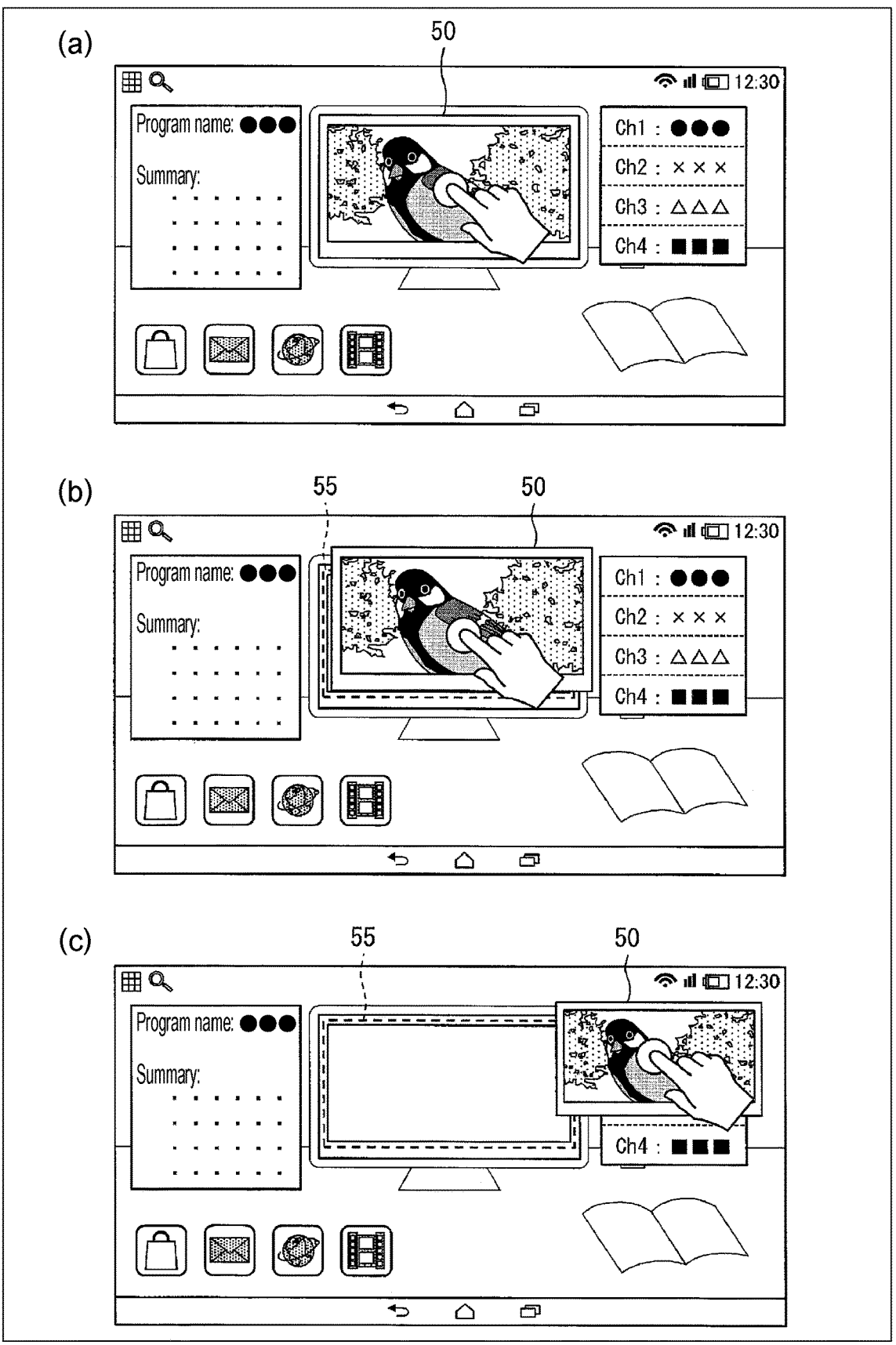

(a) to (c) in FIG. 8 are diagrams that illustrate screen transition examples in a case of switching from the mini-TV home mode to the mini-TV free mode according to the first embodiment of the present invention.

Figure 9:
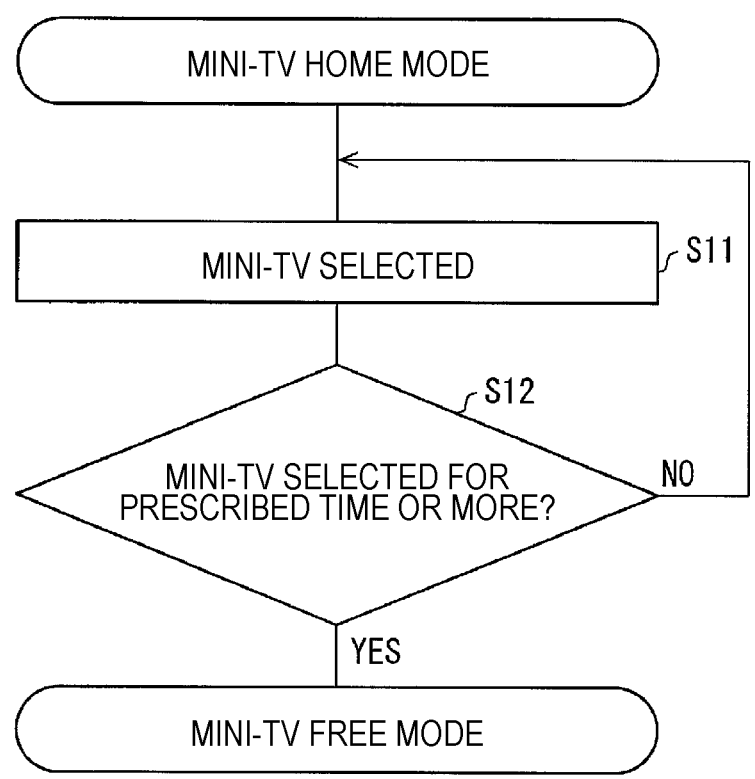

FIG. 9 is a flowchart that illustrates switching procedures from the mini-TV home mode to the mini-TV free mode according to the first embodiment of the present invention.

Figure 10:
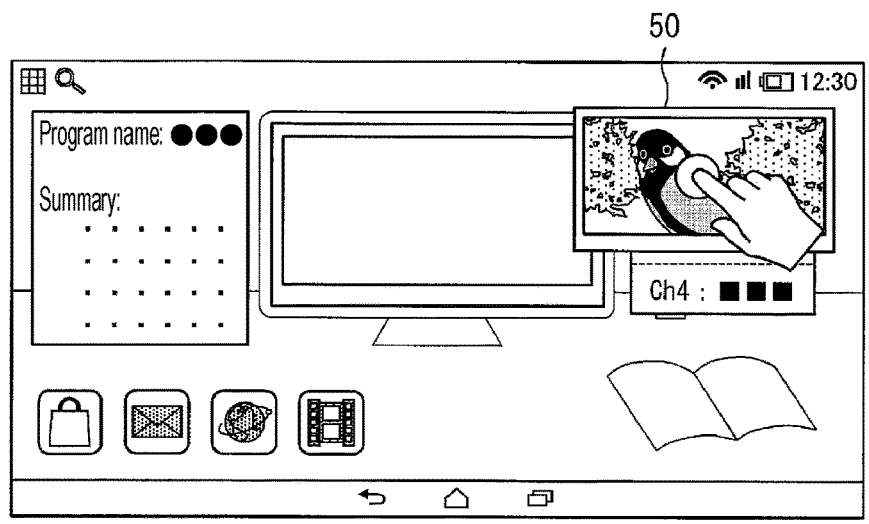
Figure 10:
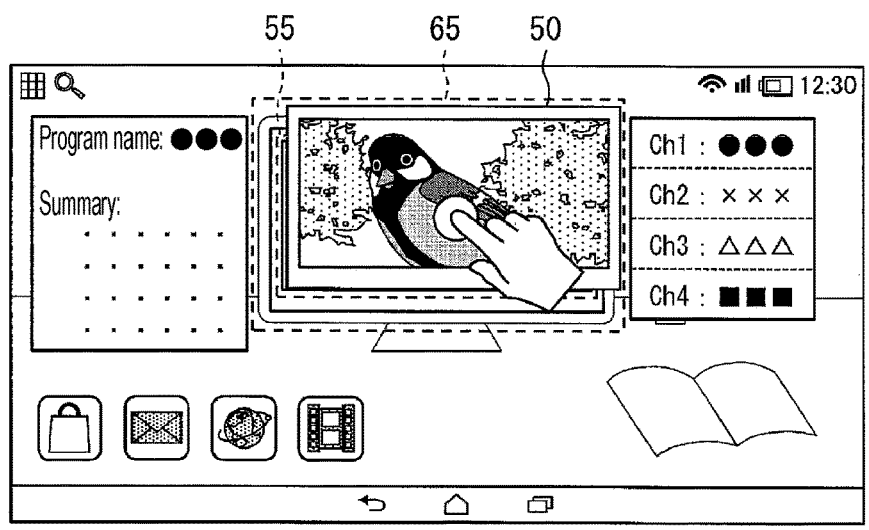
Figure 10:
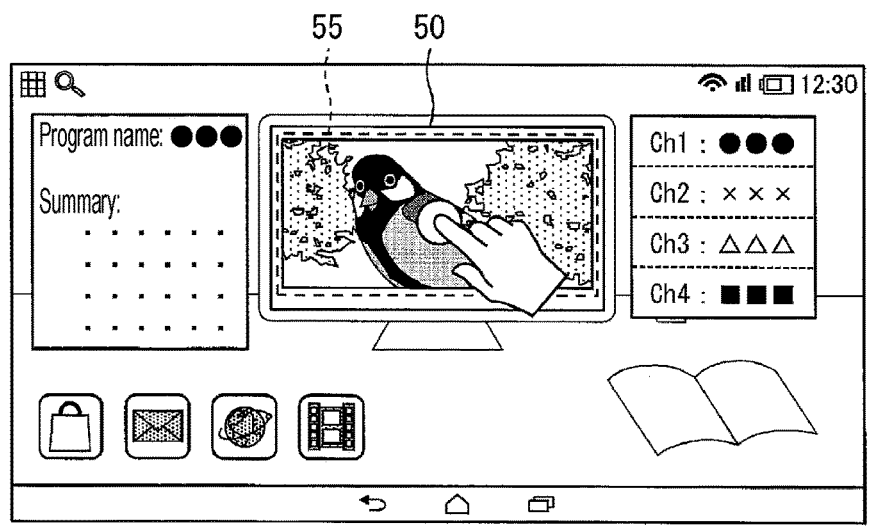

(a) to (c) in FIG. 10 are diagrams that illustrate screen transition examples in a case of switching from the mini-TV free mode to the mini-TV home mode according to the first embodiment of the present invention.

Figure 11:
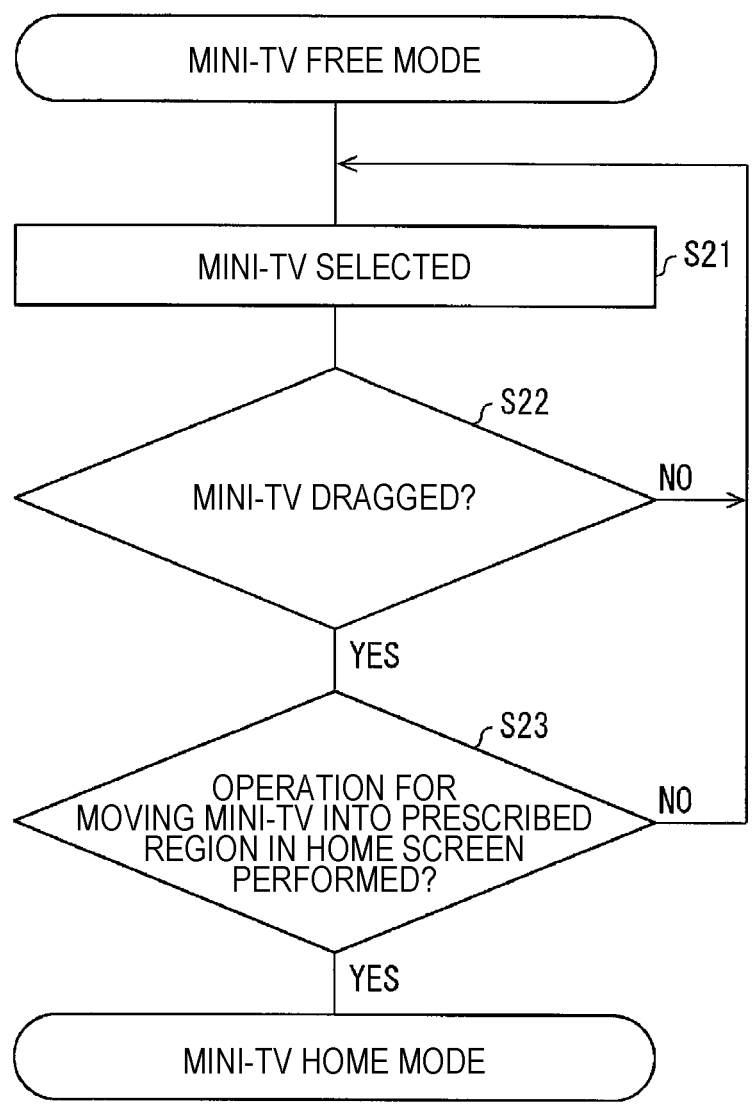

FIG. 11 is a flowchart that illustrates switching procedures from the mini-TV free mode to the mini-TV home mode according to the first embodiment of the present invention.

Figure 12:
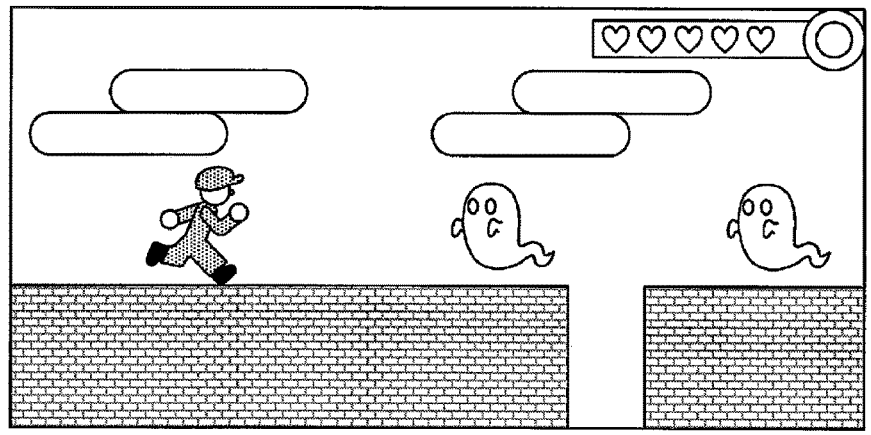
Figure 12:
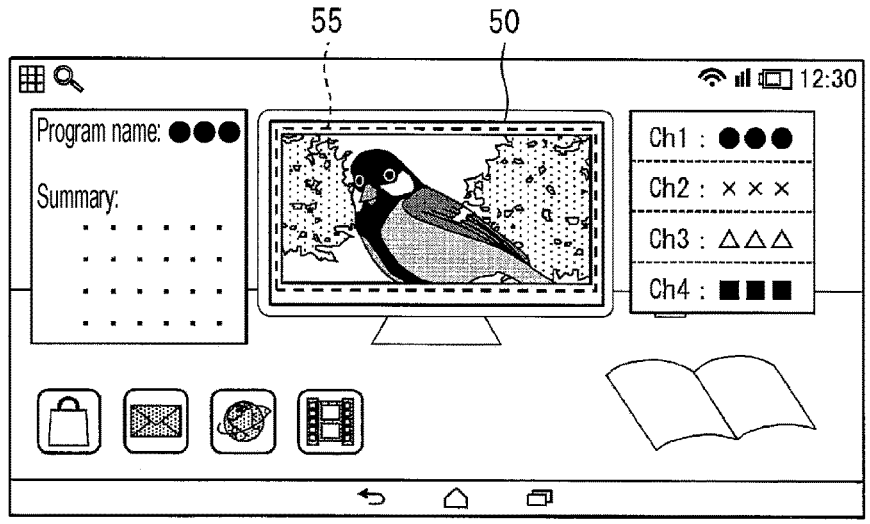
Figure 12:
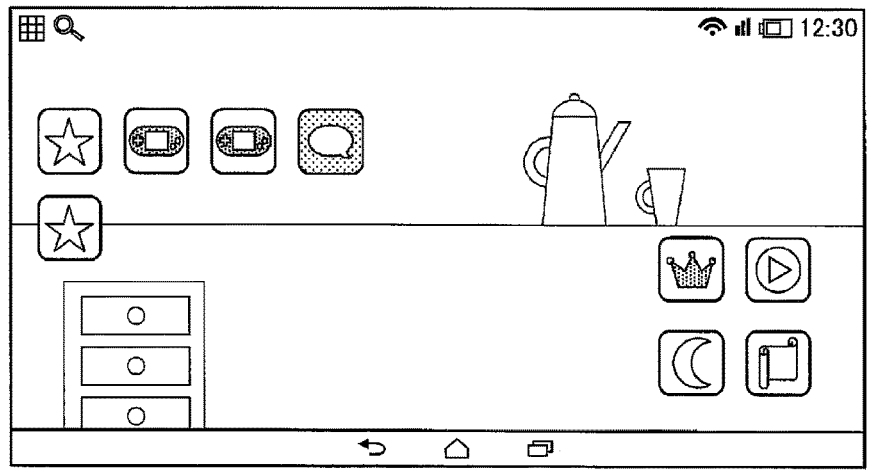

(a) to (c) in FIG. 12 are diagrams that illustrate screen transition examples in a case where a home button of the display device is pressed during execution of an application by full screen display in the mini-TV home mode according to the first embodiment of the present invention.

Figure 13:
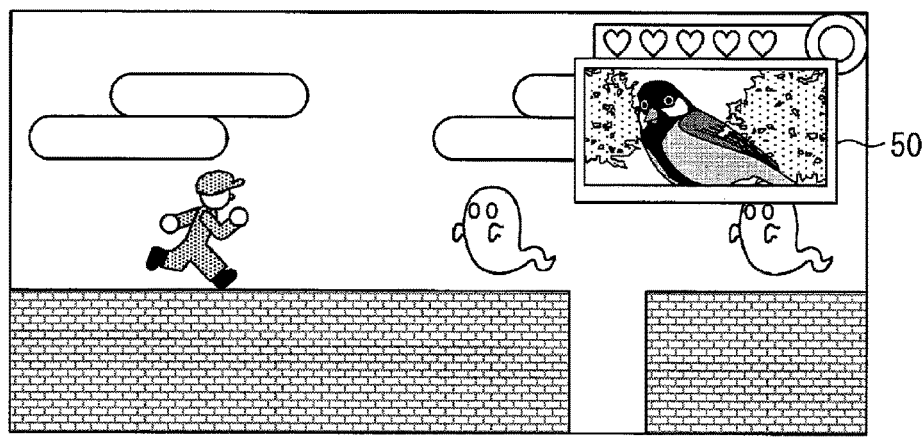
Figure 13:
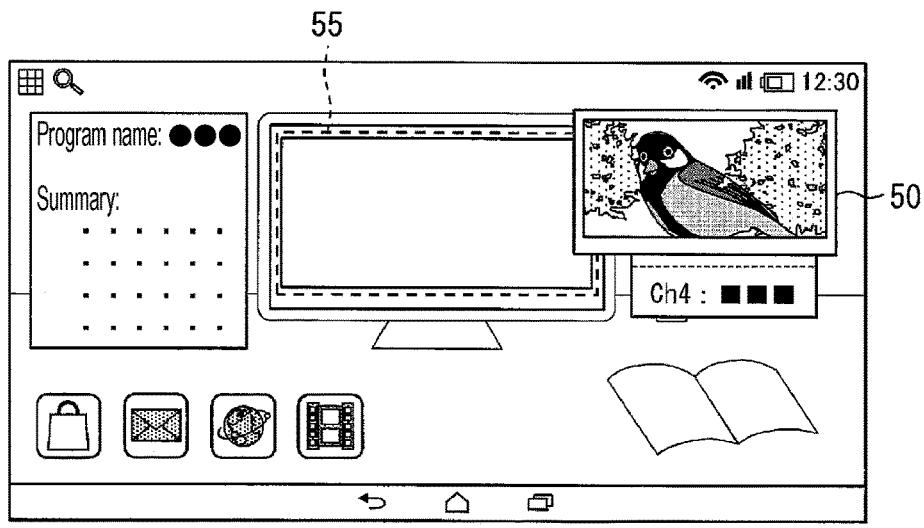
Figure 13:
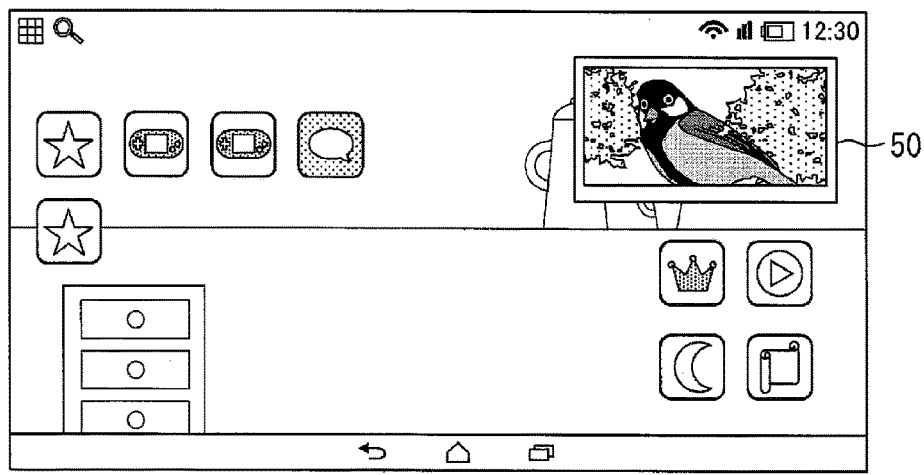

(a) to (c) in FIG. 13 are diagrams that illustrate screen transition examples in a case where a home button of the display device is pressed during execution of an application by full screen display in the mini-TV free mode according to the first embodiment of the present invention.

Figure 14:
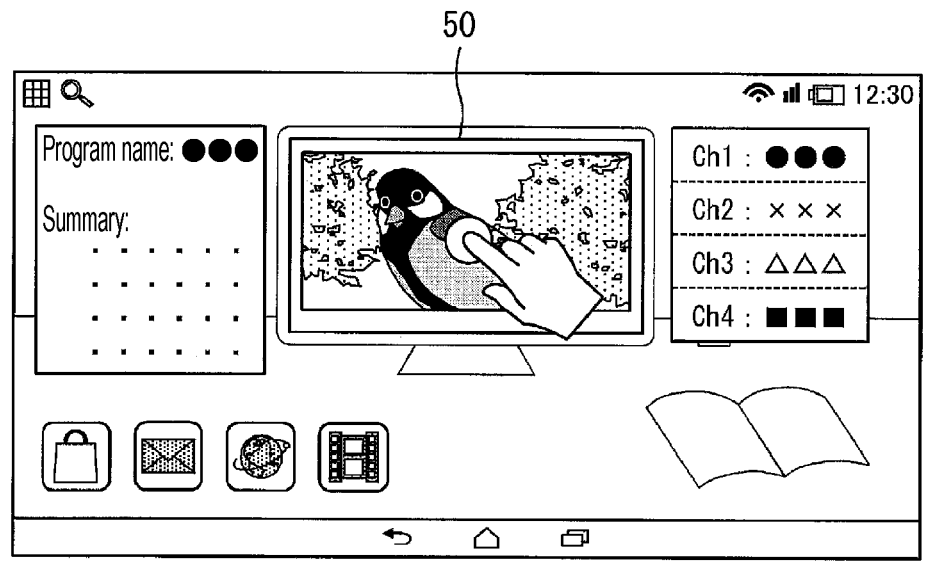
Figure 14:
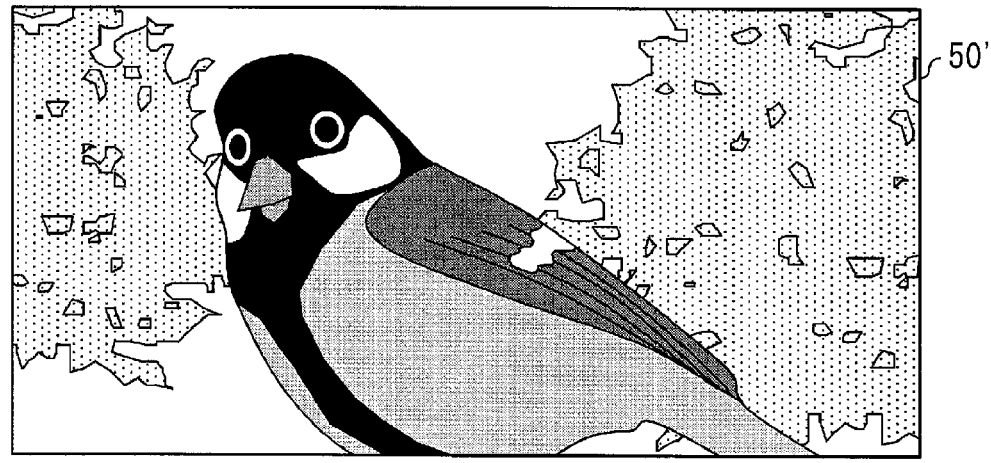

(a) and (b) in FIG. 14 are diagrams that illustrate screen transition examples in a case where a mini-TV that is displayed on the home screen is tapped in the mini-TV home mode according to the first embodiment of the present invention.

Figure 15:
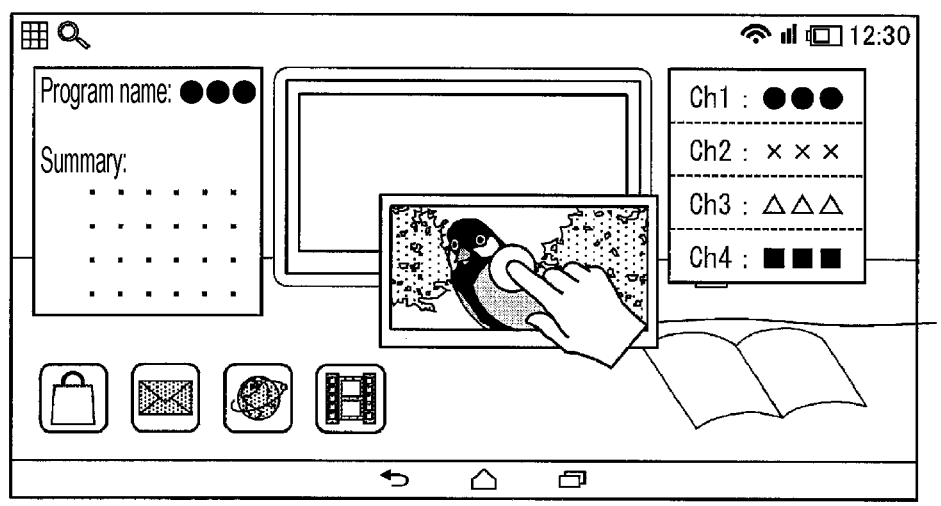
Figure 15:
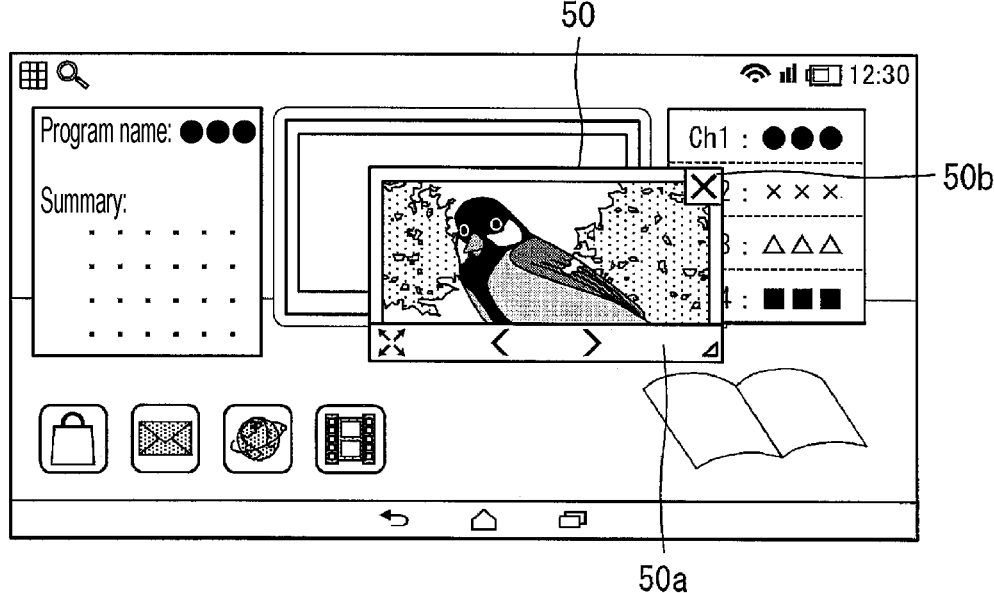

(a) and (b) in FIG. 15 are diagrams that illustrate screen transition examples in a case where the mini-TV that is displayed on the home screen is tapped in the mini-TV free mode according to the first embodiment of the present invention.

Figure 16:
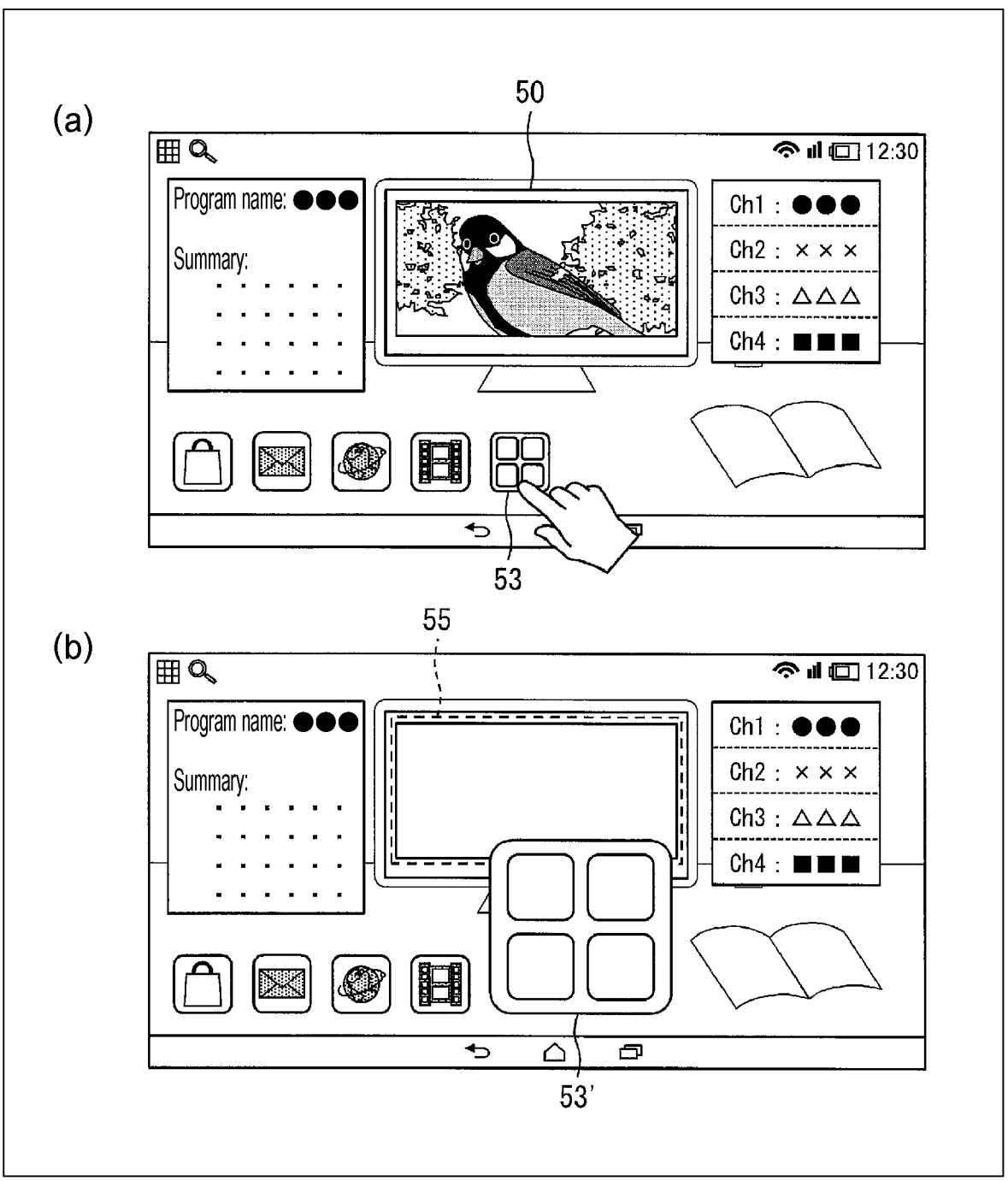

(a) and (b) in FIG. 16 are diagrams that illustrate screen transition examples in a case where an icon folder that is displayed on the home screen is tapped in the mini-TV home mode according to the first embodiment of the present invention.

Figure 17:
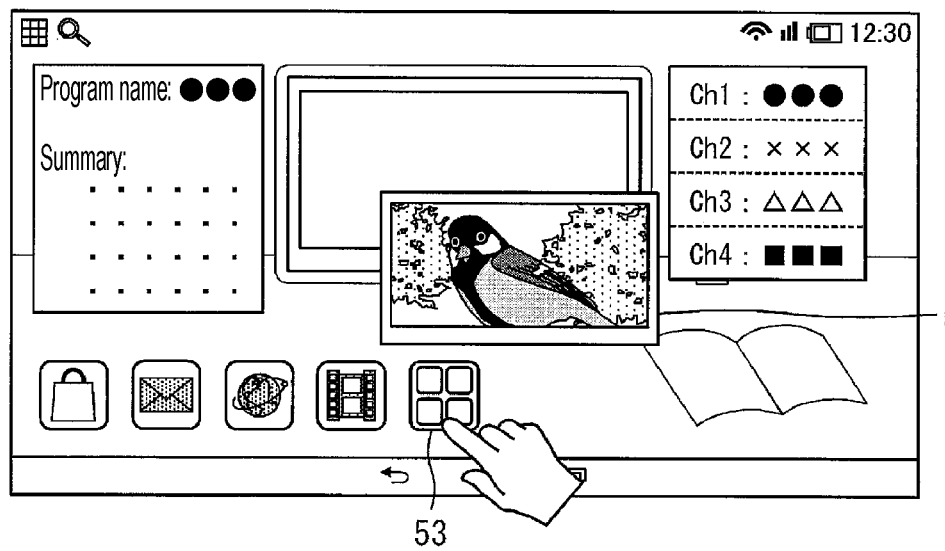
Figure 17:
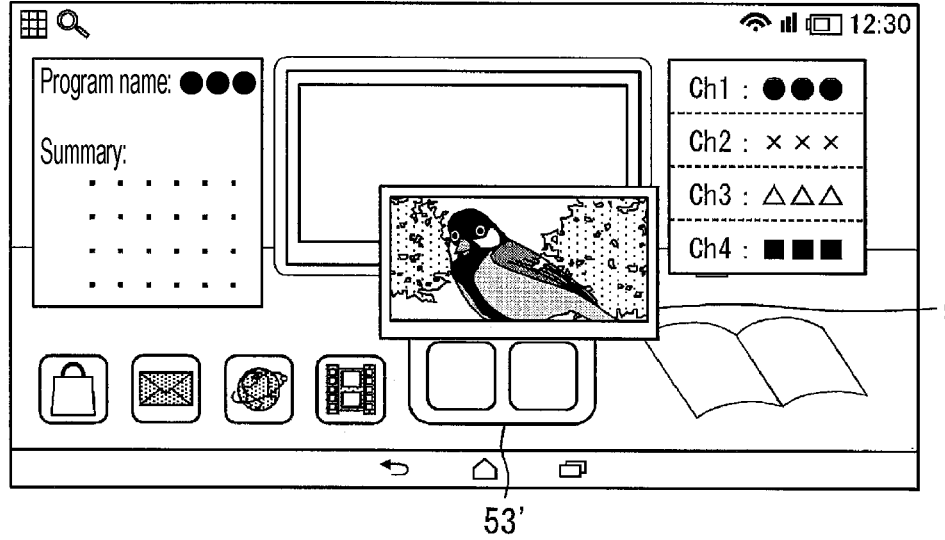

(a) and (b) in FIG. 17 are diagrams that illustrate screen transition examples in a case where the icon folder that is displayed on the home screen is tapped in the mini-TV free mode according to the first embodiment of the present invention.

Figure 18:
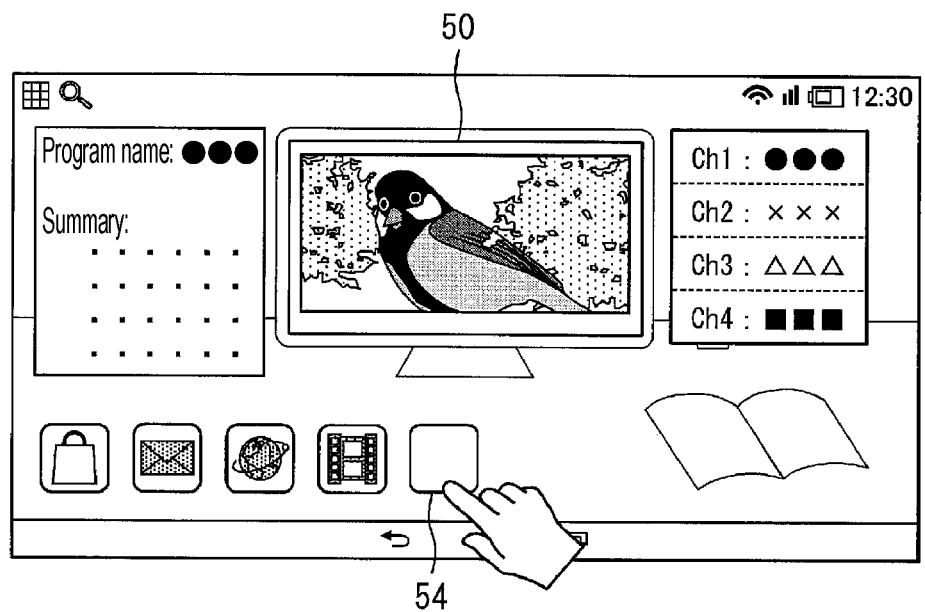
Figure 18:
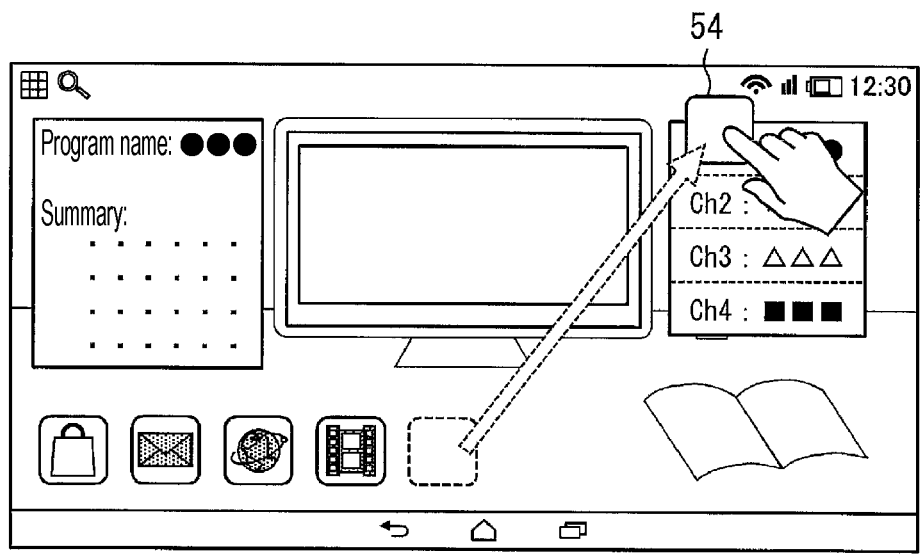

(a) and (b) in FIG. 18 are diagrams that illustrate screen transition examples in a case where an icon that is displayed on the home screen is moved in the mini-TV home mode according to the first embodiment of the present invention.

Figure 19:
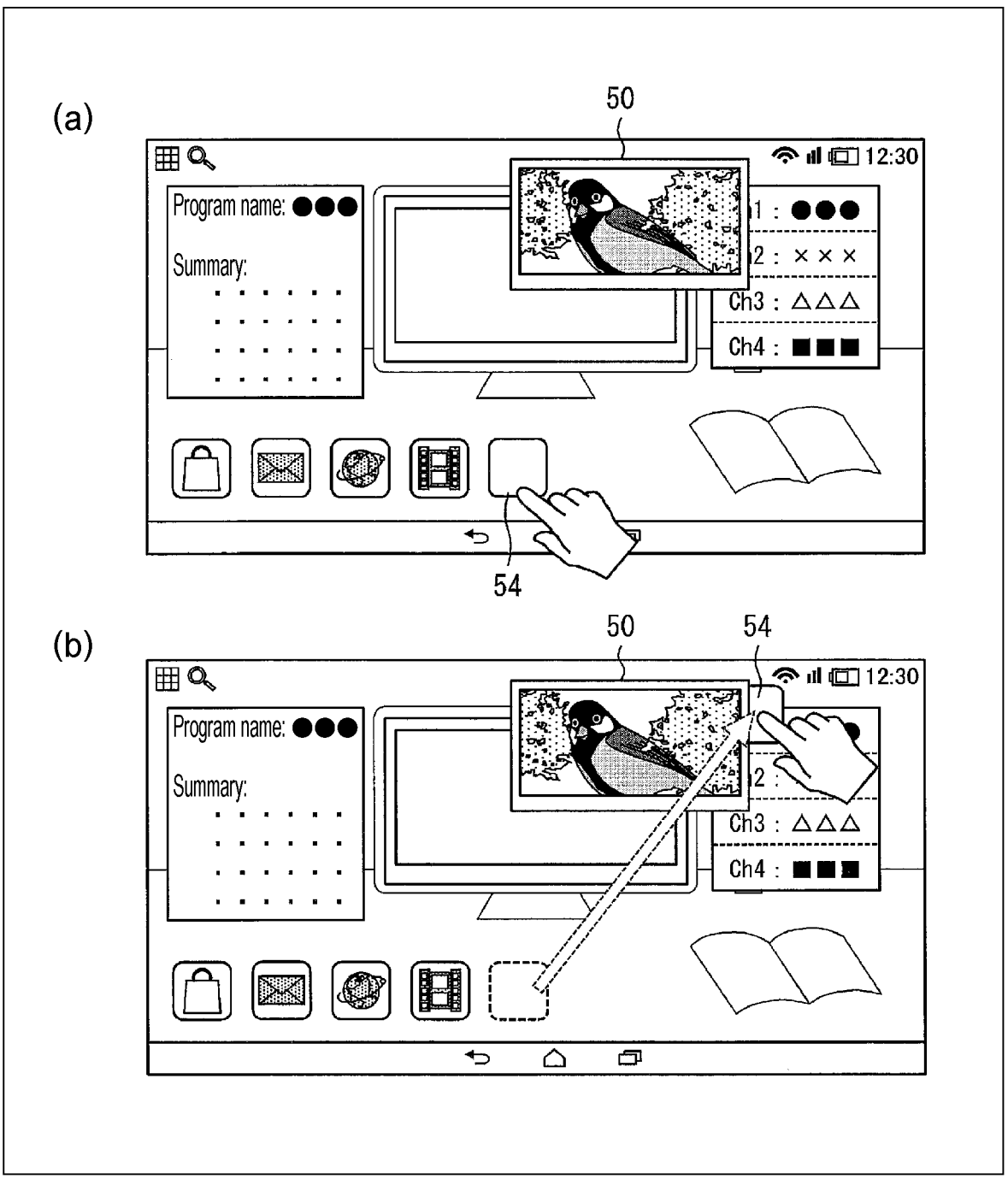

(a) and (b) in FIG. 19 are diagrams that illustrate screen transition examples in a case where the icon that is displayed on the home screen is moved in the mini-TV free mode according to the first embodiment of the present invention.

Figure 20:
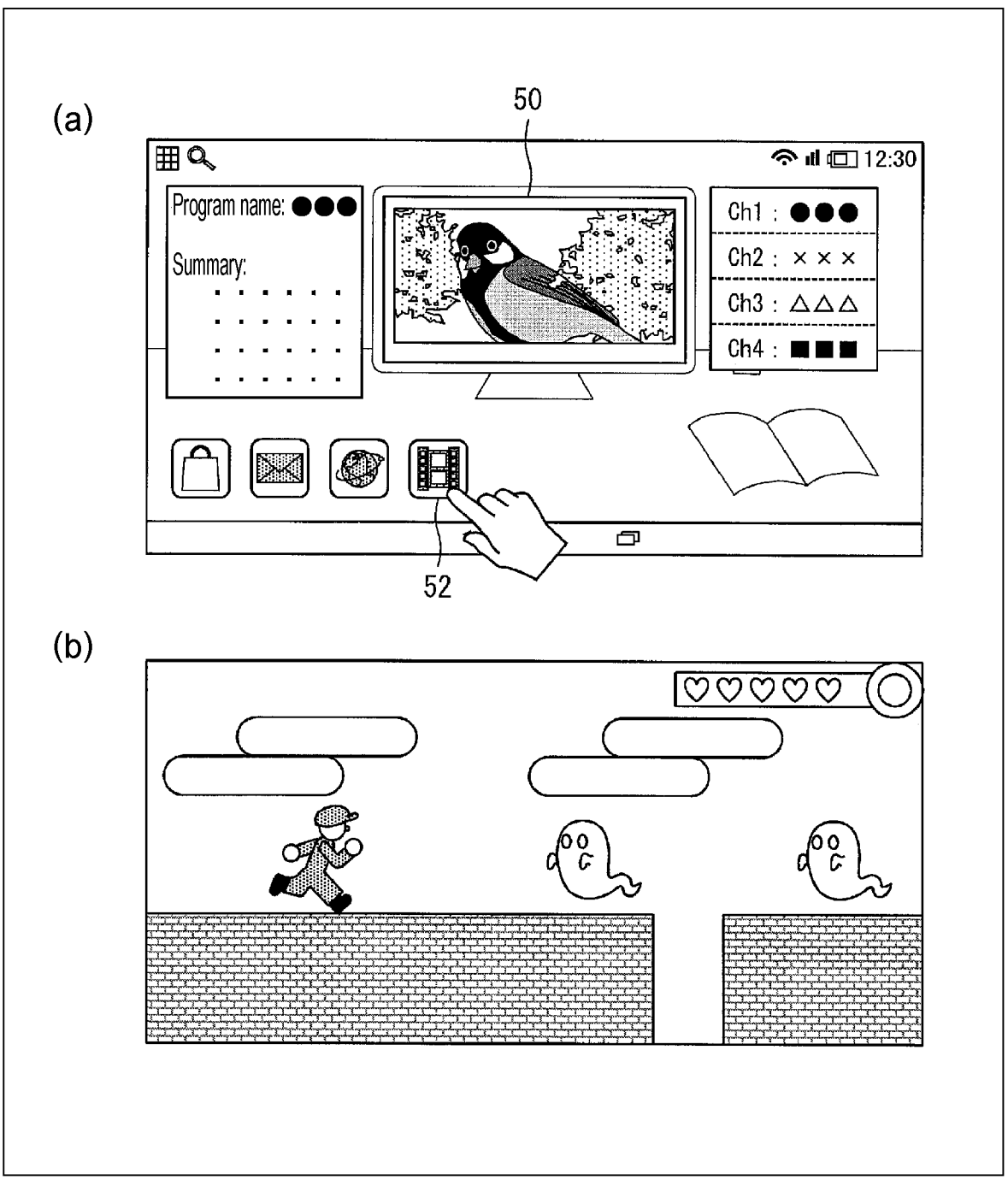

(a) and (b) in FIG. 20 are diagrams that illustrate screen transition examples in a case where an application is started in the mini-TV home mode according to the first embodiment of the present invention.

Figure 21:
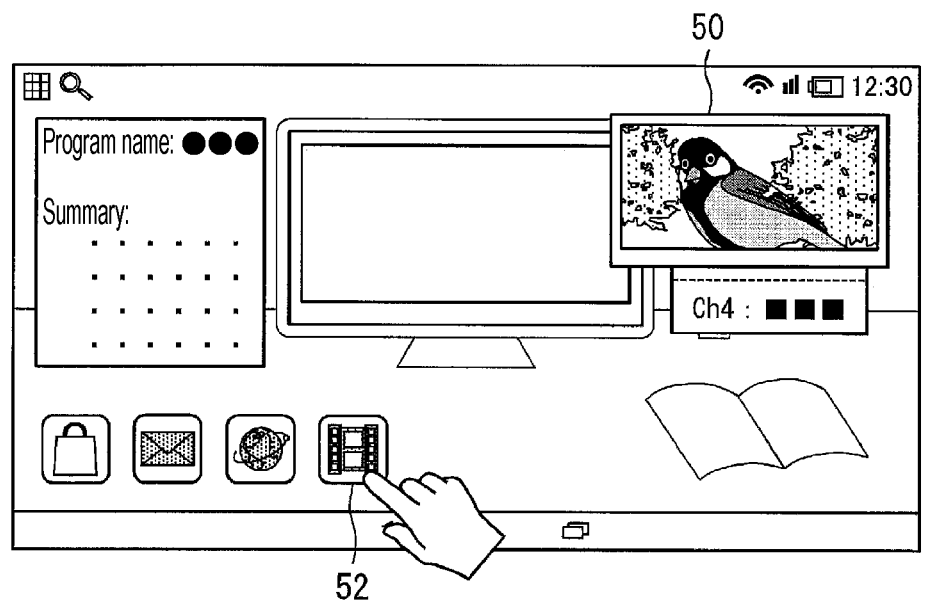
Figure 21:
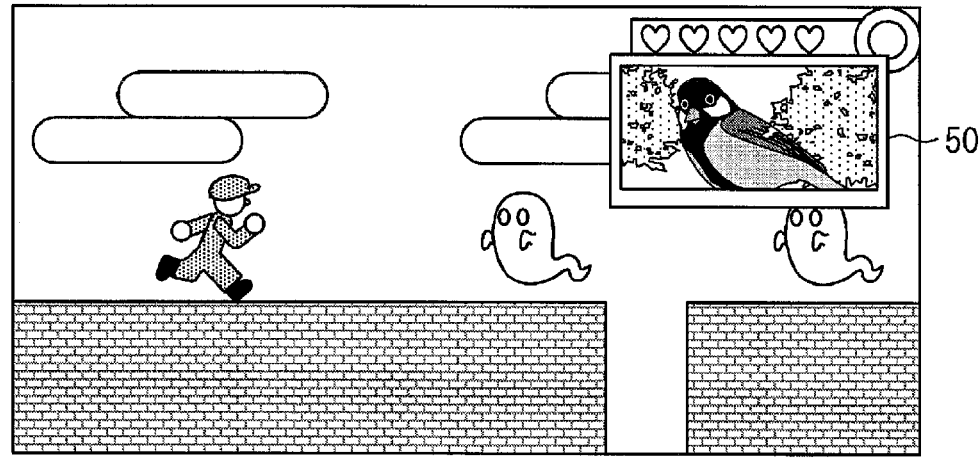

(a) and (b) in FIG. 21 are diagrams that illustrate screen transition examples in a case where the application is started in the mini-TV free mode according to the first embodiment of the present invention.

Figure 22:
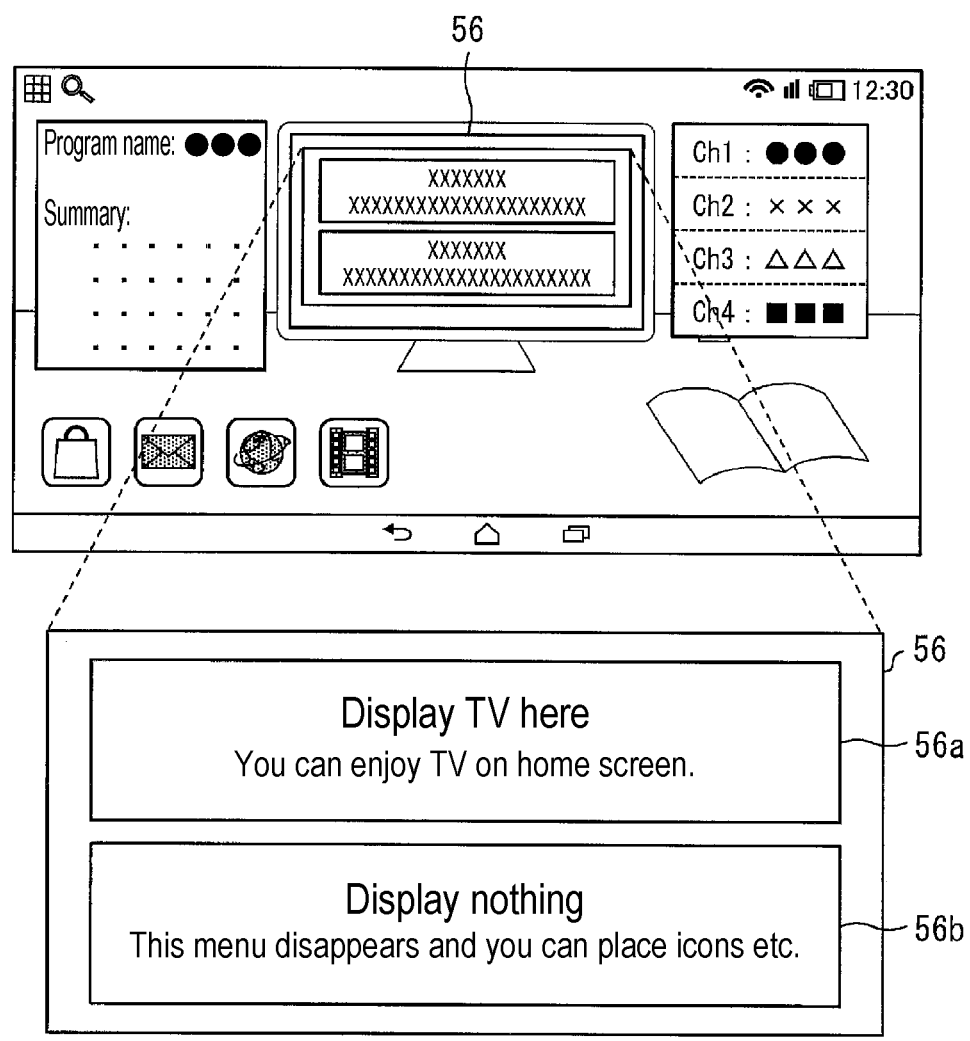

FIG. 22 is a diagram that illustrates a display example of a selection menu, in which a display setting of the mini-TV may be selected, according to the first embodiment of the present invention.

Figure 23:
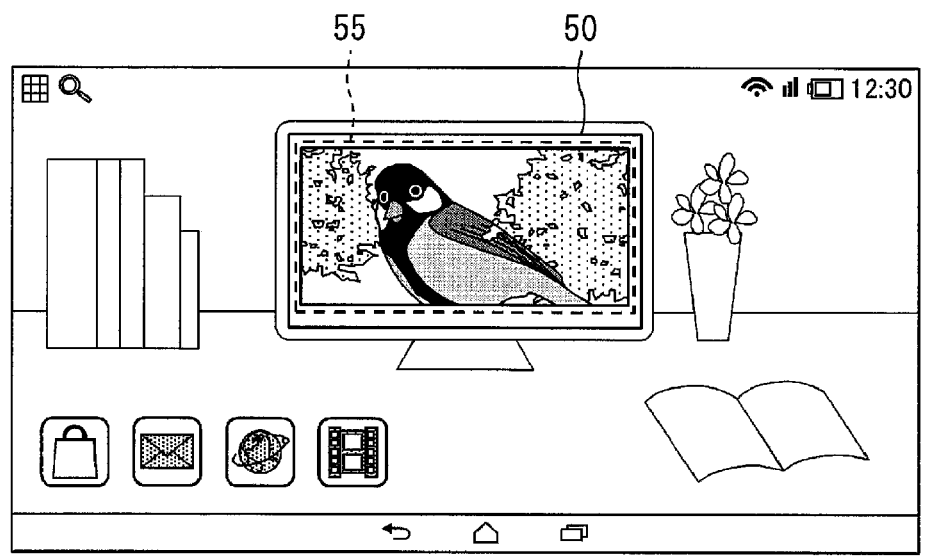
Figure 23:
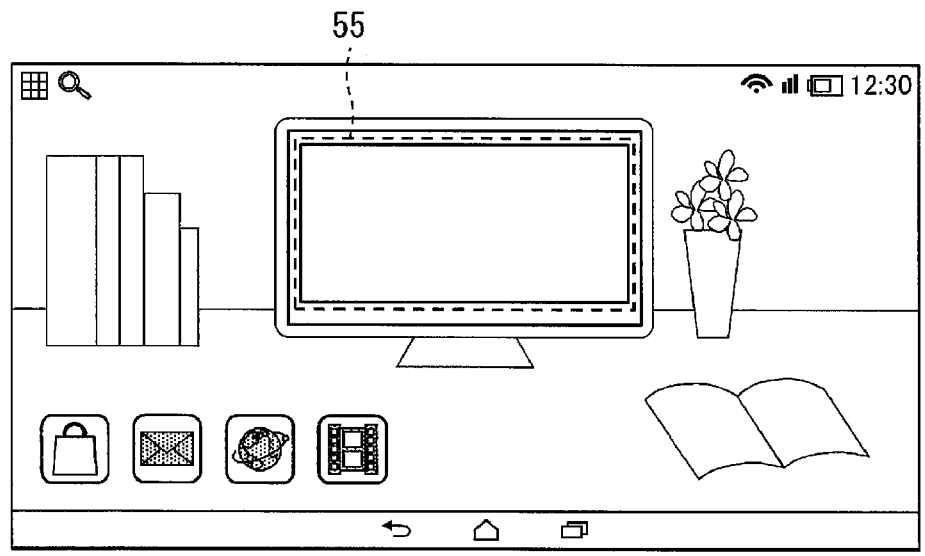

(a) and (b) in FIG. 23 are diagrams that illustrate screen display examples that correspond to display settings of the mini-TV according to the first embodiment of the present invention.

Figure 24:
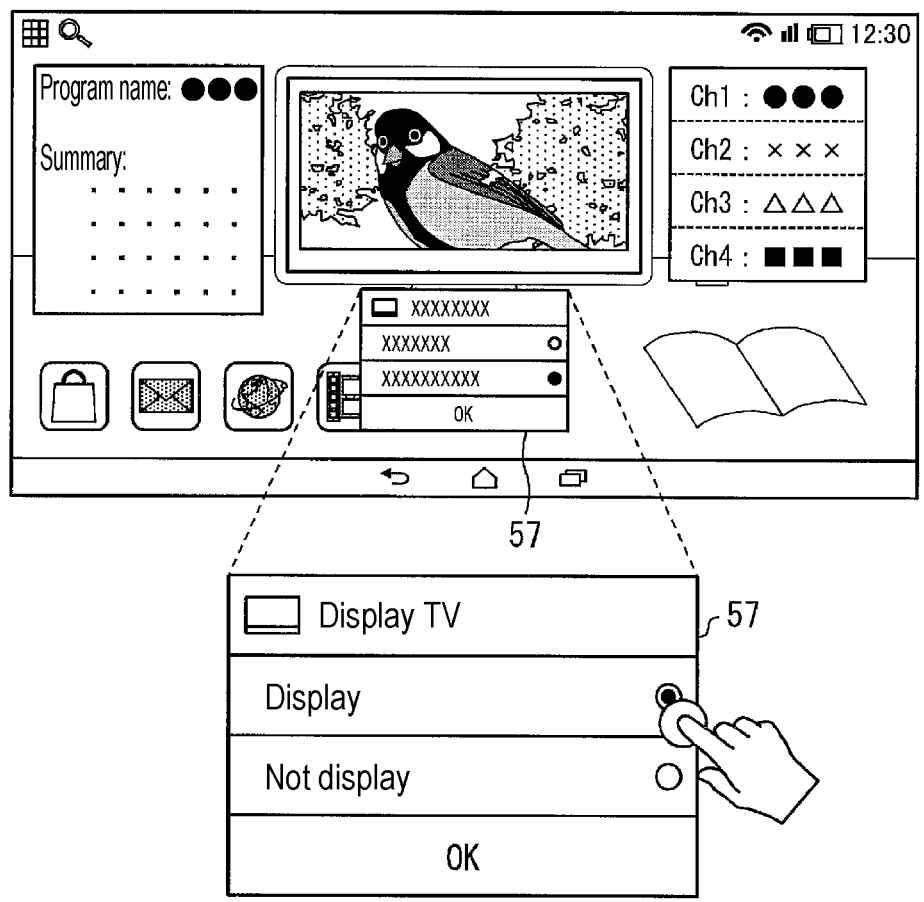

FIG. 24 is a diagram that illustrates a display example of a selection menu, in which whether or not the mini-TV is displayed may be selected, according to the first embodiment of the present invention.

Figure 25:
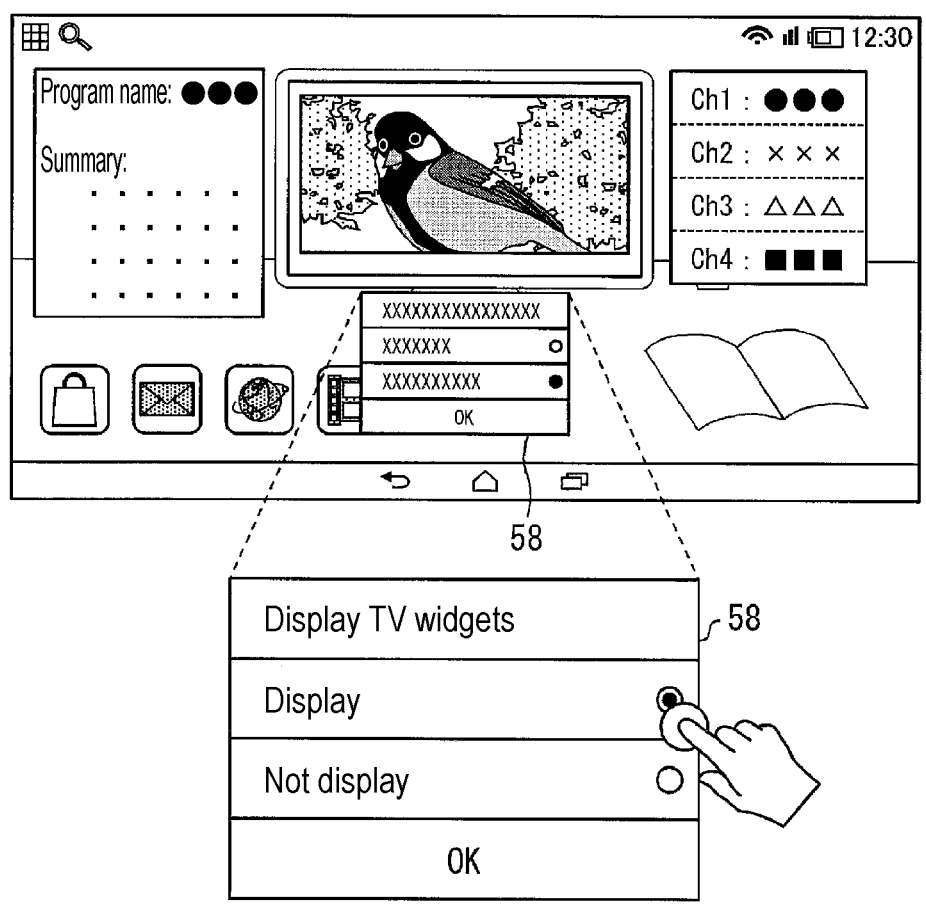

FIG. 25 is a diagram that illustrates a display example of a selection menu, in which whether or not a widget for the mini-TV is displayed may be selected, according to the first embodiment of the present invention.

Figure 26:
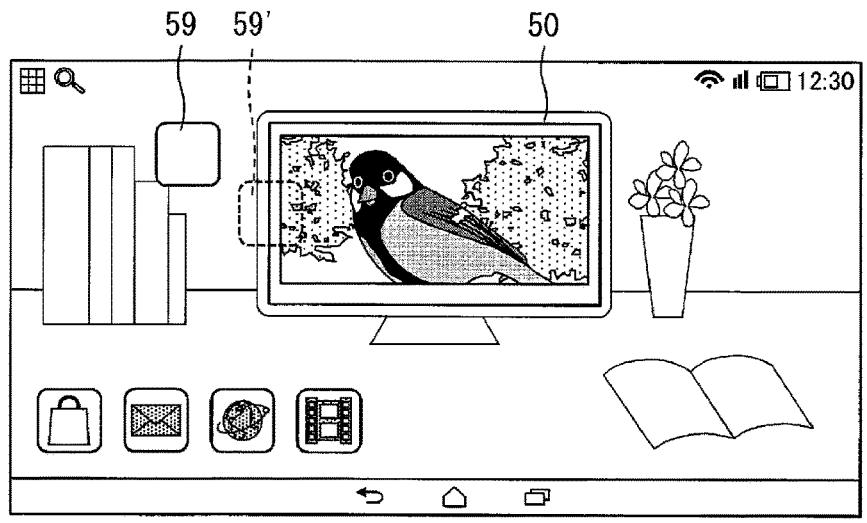
Figure 26:
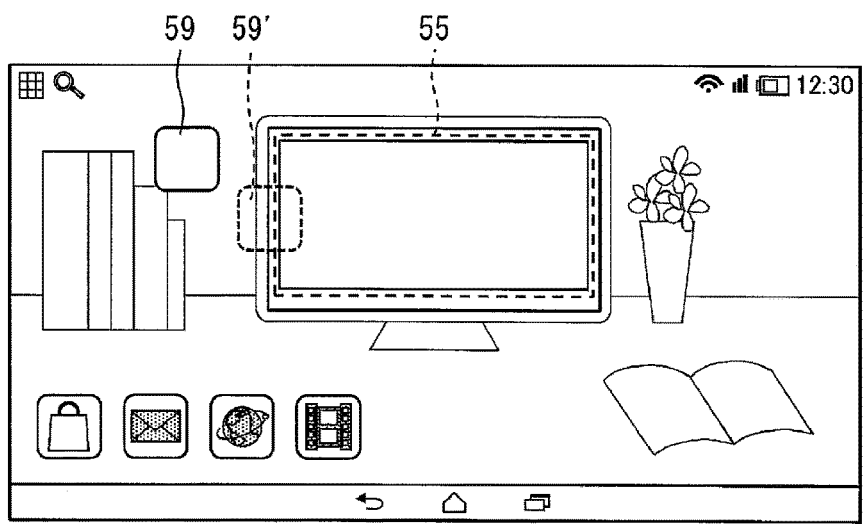
Figure 26:
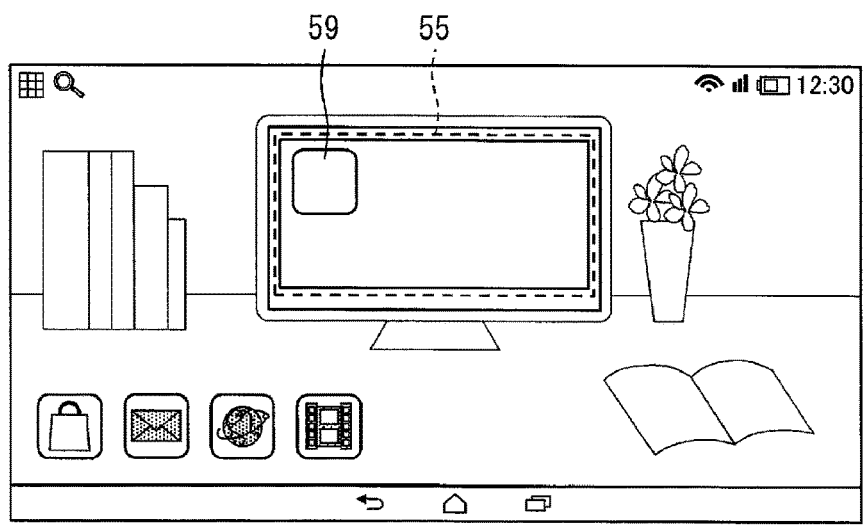

(a) to (c) in FIG. 26 are diagrams that illustrate screen display examples in a case where a new application is downloaded in the display settings according to the first embodiment of the present invention.

Figure 27:
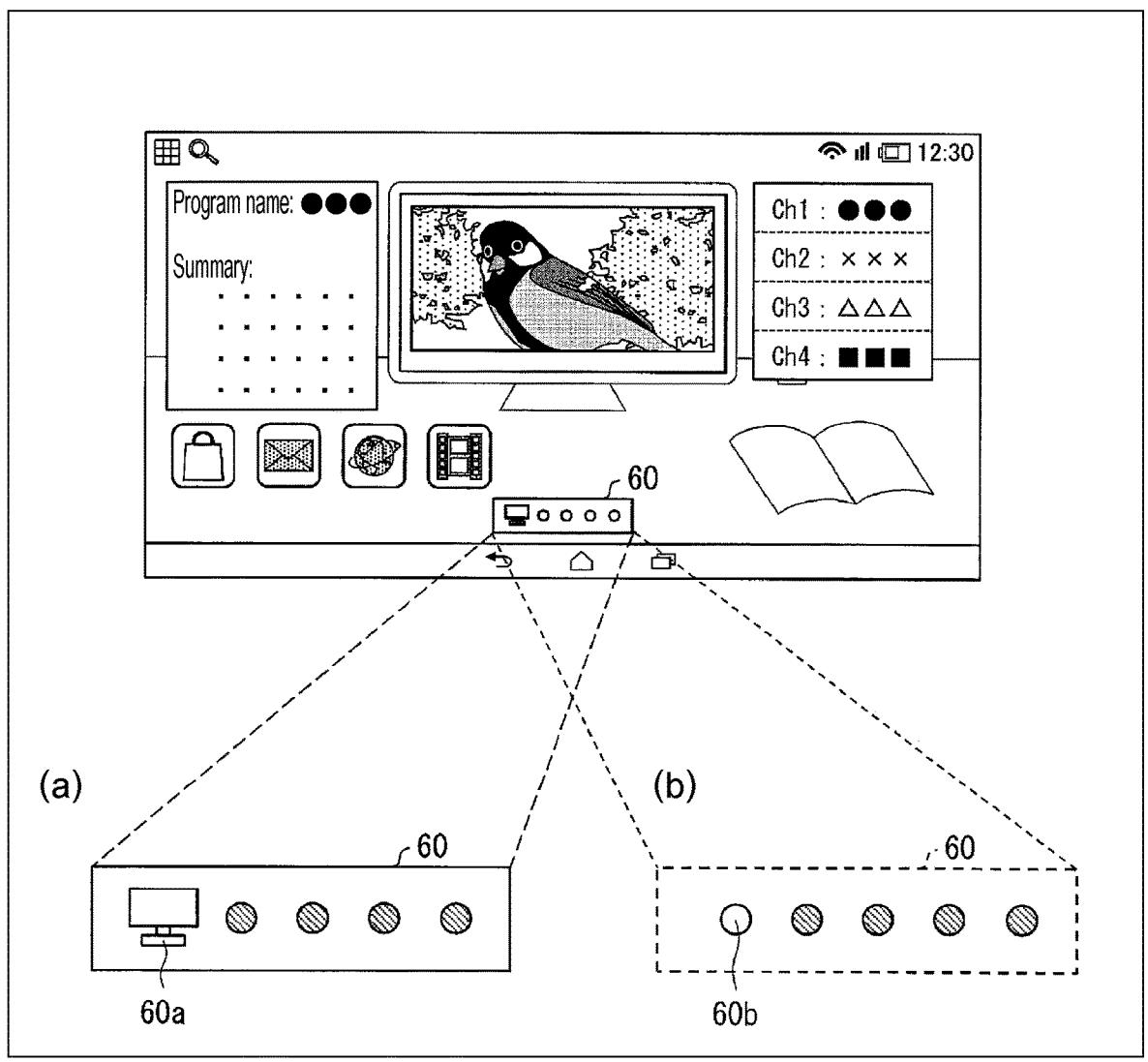

(a) and (b) in FIG. 27 are diagrams that illustrate display examples of indicators in the display settings according to the first embodiment of the present invention.

Figure 28:
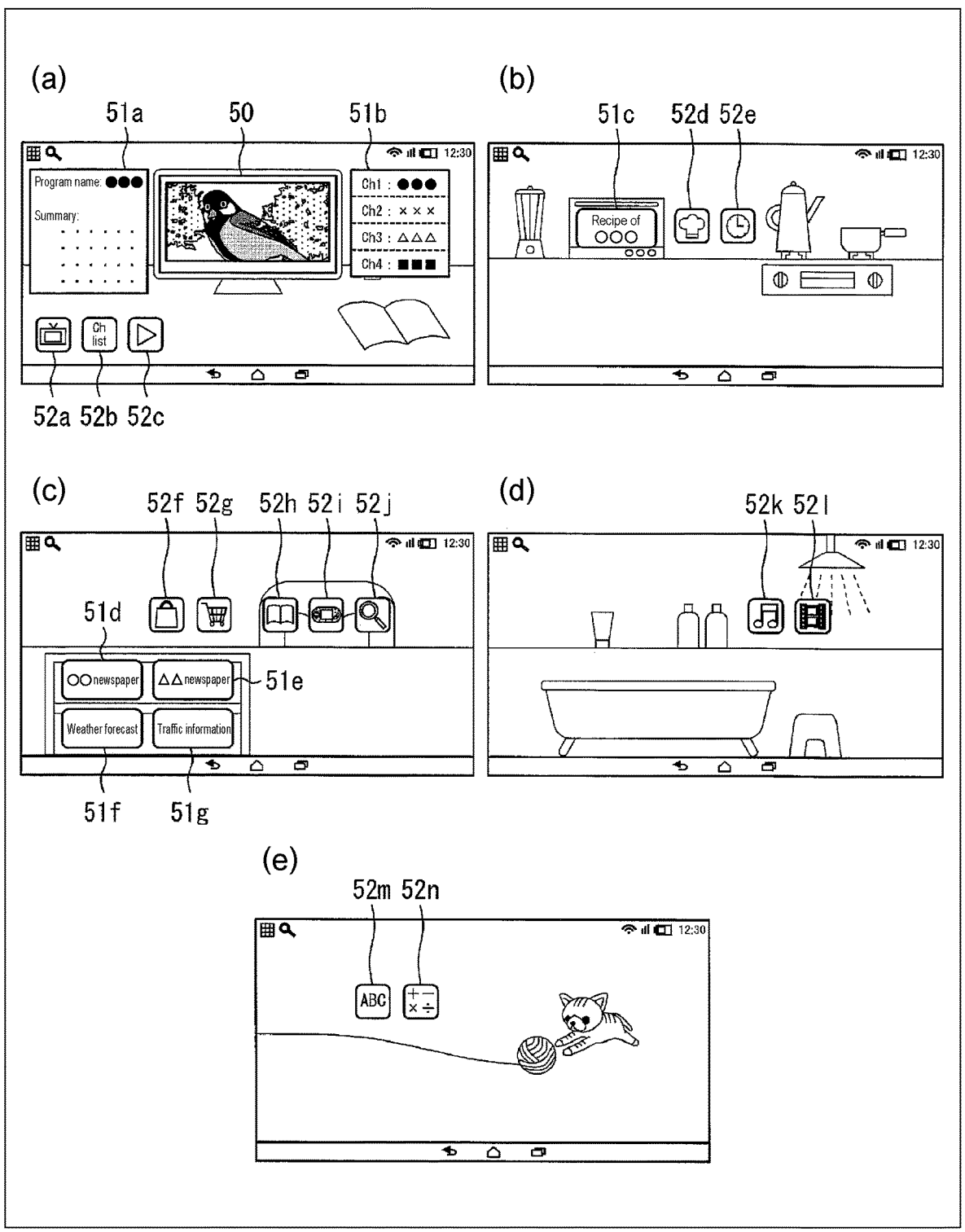

(a) to (d) in FIG. 28 are diagrams that illustrate respective screen display examples of five pages with different themes.

Figure 29:
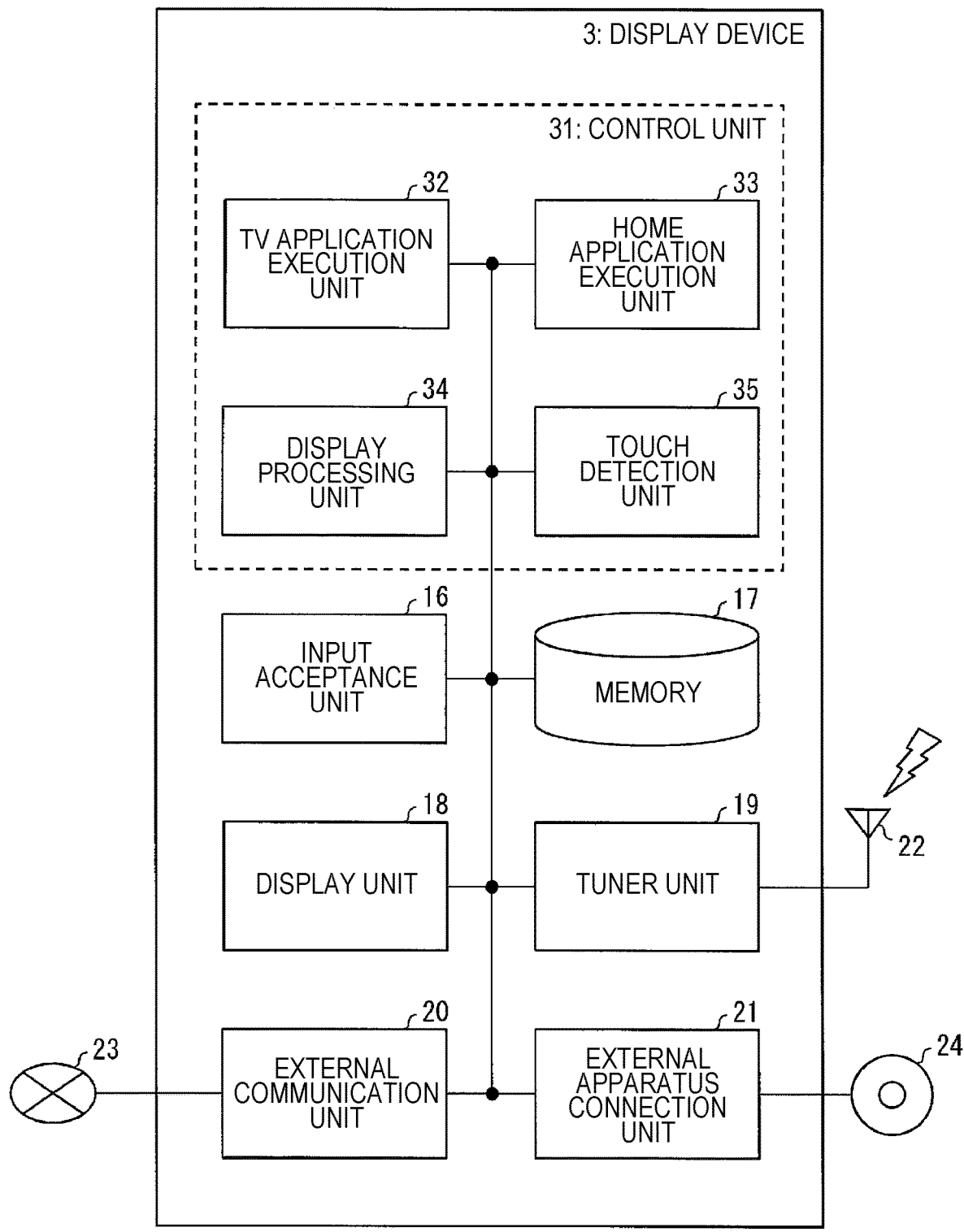

FIG. 29 is a block diagram that illustrates a configuration of a display device according to a second embodiment of the present invention.

Figure 30:
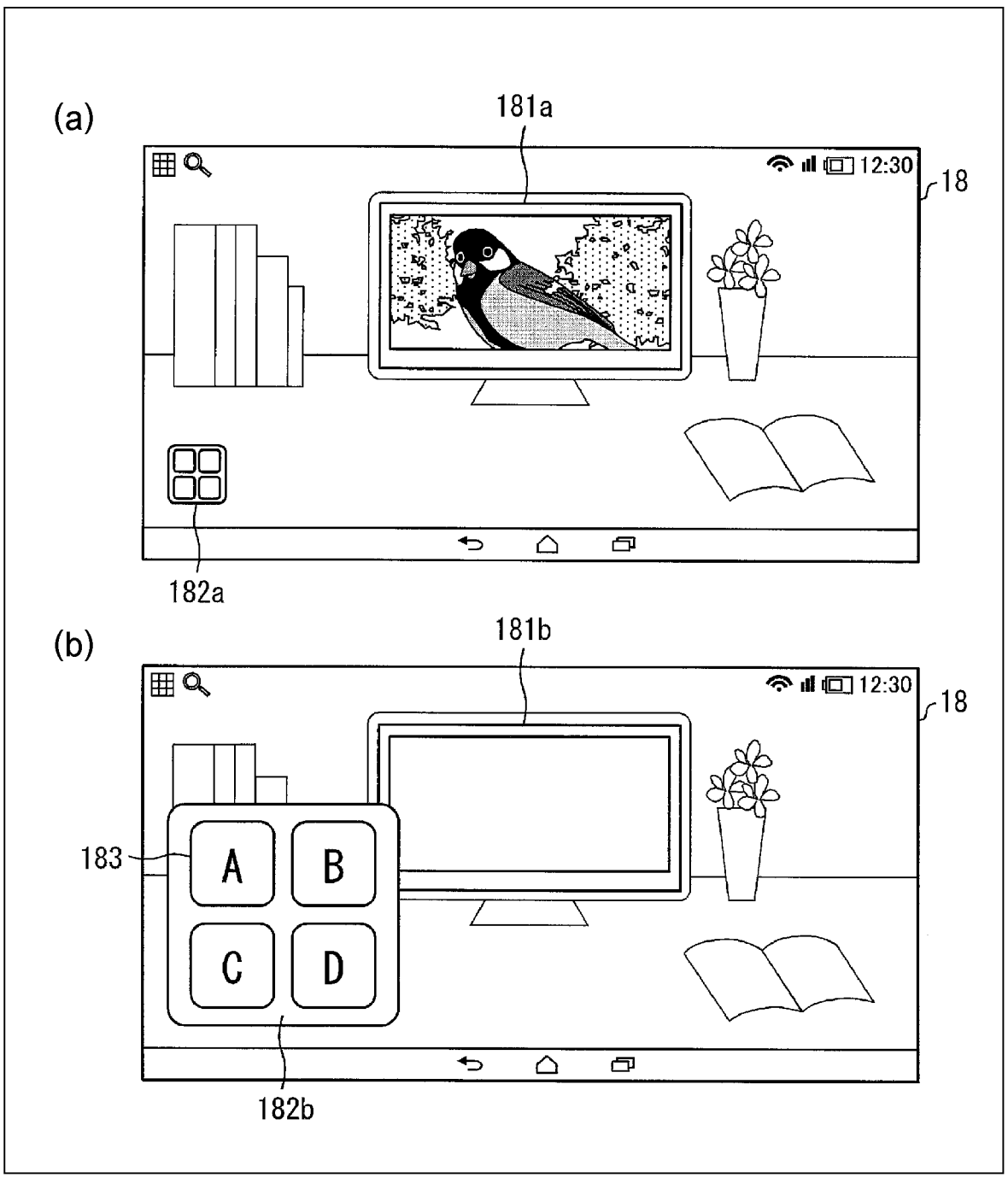

FIG. 30 is a screen configuration diagram that illustrates an action example 1 of the display device according to the second embodiment of the present invention, in which (a) illustrates a screen configuration at a time before an icon folder is expanded and (b) illustrates a screen configuration at a time after the icon folder is expanded.

Figure 31:
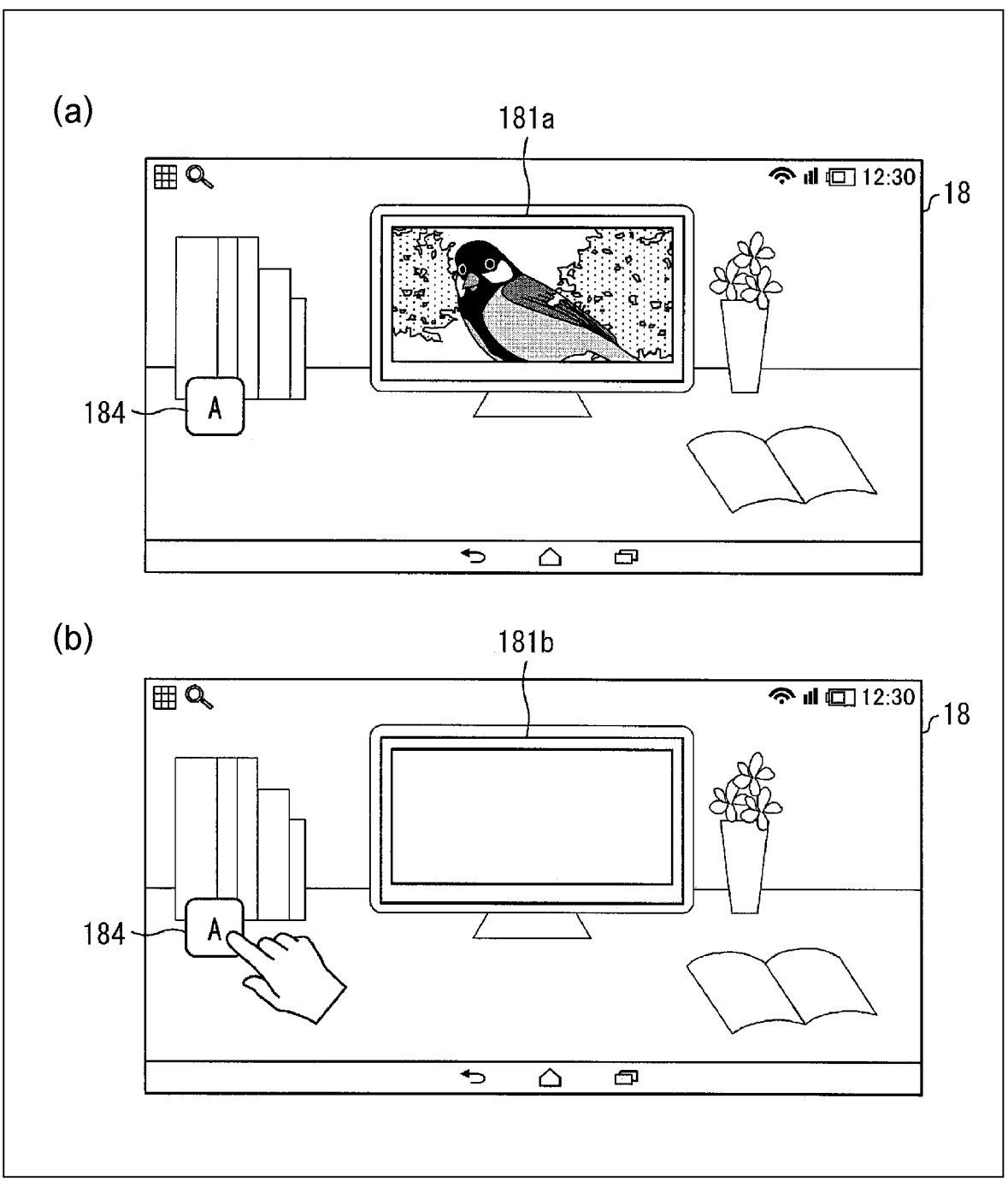

FIG. 31 is a screen configuration diagram that illustrates an action example 2 of the display device according to the second embodiment of the present invention, in which (a) illustrates a screen configuration at a time before an icon is held down and (b) illustrates a screen configuration at a time after the icon is held down.

Figure 32:
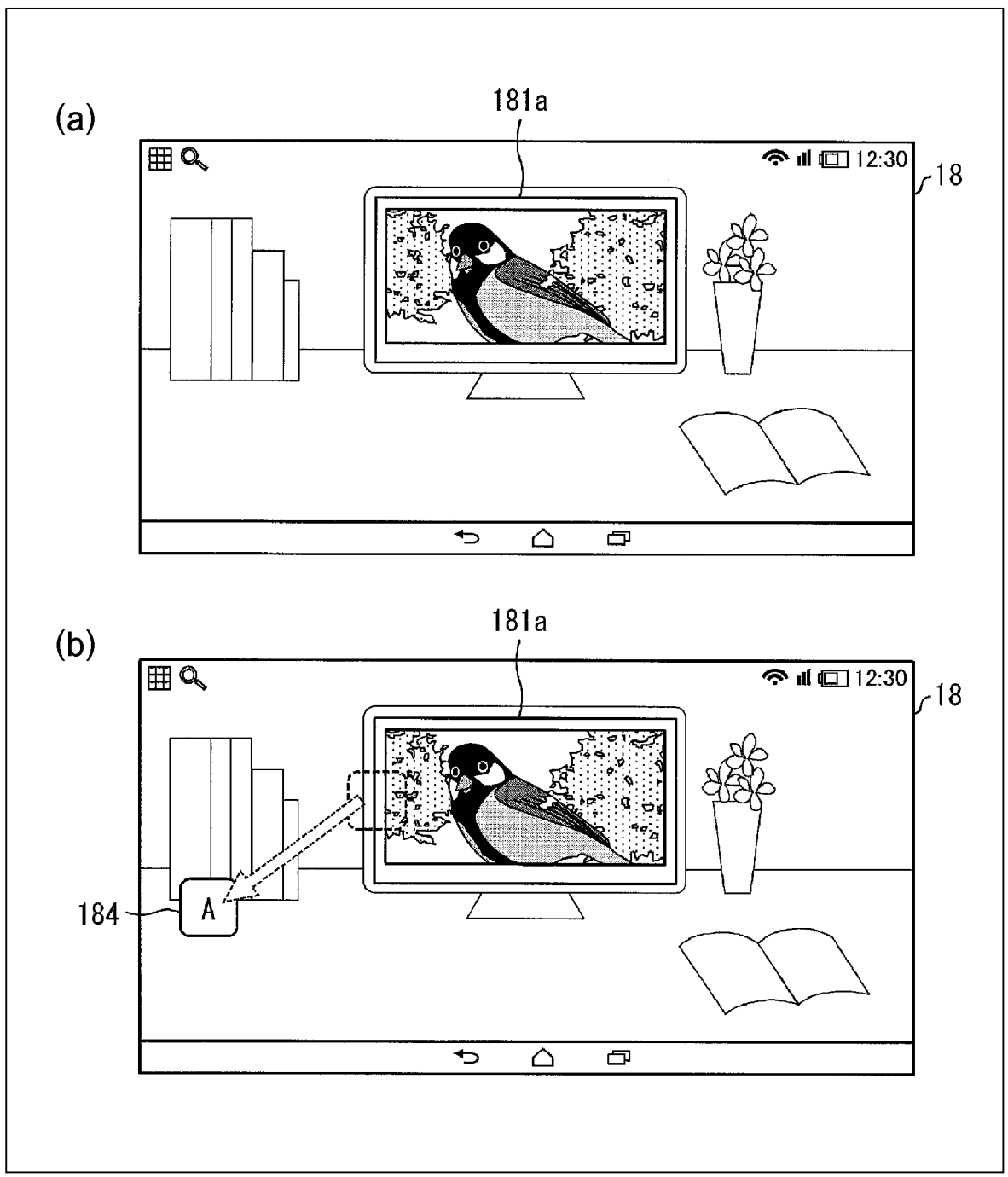

FIG. 32 is a screen configuration diagram that illustrates an action example 3 of the display device according to the second embodiment of the present invention, in which (a) illustrates a screen configuration at a time before an application is installed and (b) illustrates a screen configuration at a time after the application is installed.

DESCRIPTION OF EMBODIMENTS

First Embodiment

A first embodiment of the present invention will hereinafter be described in detail.
(Outline of Display Device)

A display device according to this embodiment displays one or plural objects on a slidable background. As the background, a home screen is raised. A home screen is a screen in which plural objects such as icons of applications and widgets that are often used by a user are arranged. The home screen is configured with plural pages, and the objects may thereby be arranged on each of the pages of the home screen and may thereby be categorized. The home screen is slid by each of the pages, and each of the pages may thereby be displayed.

Figure 2:
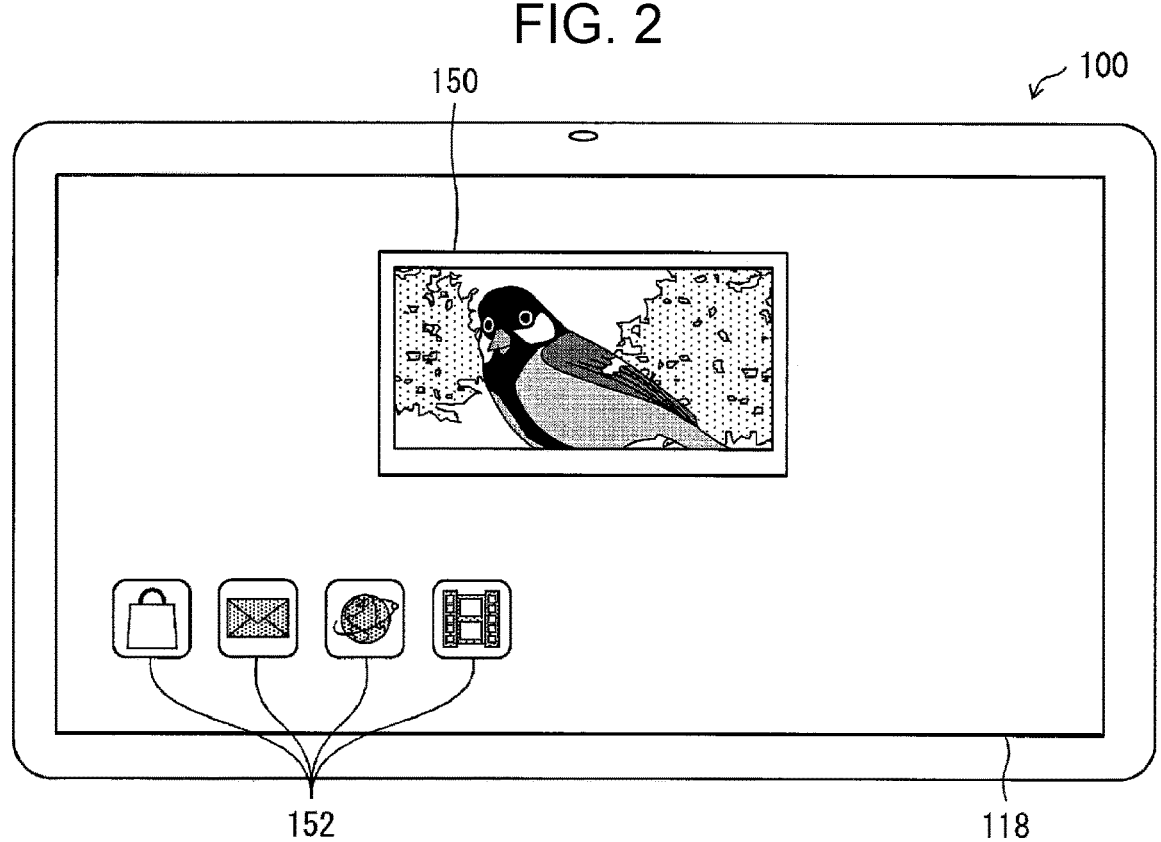
FIG. 2 is a diagram that illustrates an external appearance of a tablet terminal according to the first embodiment of the present invention.
Figure 3:
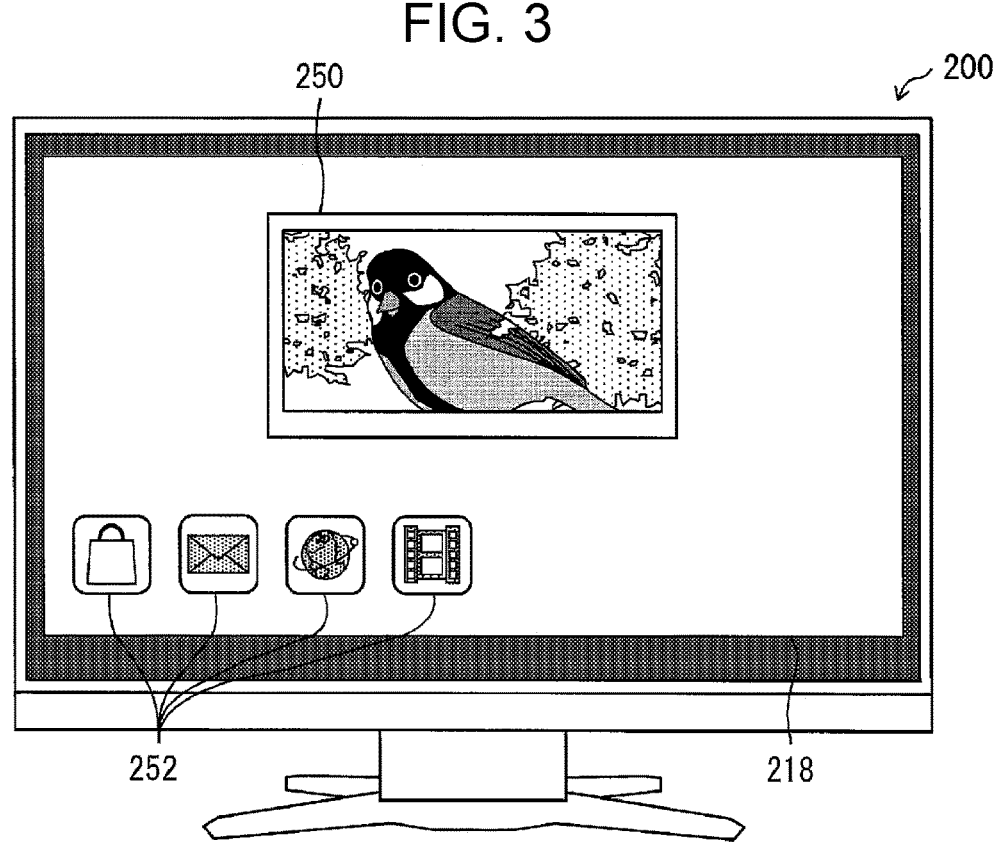
FIG. 3 is a diagram that illustrates an external appearance of a television receiver according to the first embodiment of the present invention.

The display device according to this embodiment may be realized as a tablet terminal 100 such as a smartphone or a tablet personal computer (PC) as illustrated in FIG. 2 or a television receiver 200 as illustrated in FIG. 3, for example.

As illustrated in FIG. 2, a display screen 118 of the tablet terminal 100 displays plural icons 152 and displays a TV broadcast video 150 on the home screen as the objects. Similarly, as illustrated in FIG. 3, a display screen 218 of the television receiver 200 displays plural icons 252 and displays a TV broadcast video 250 on the home screen as the objects.

Note that in this embodiment, targets to be displayed on a display screen of the display device such as icons, widgets, and contents will be referred to as objects.

(Configuration of Display Device)

Figure 1:
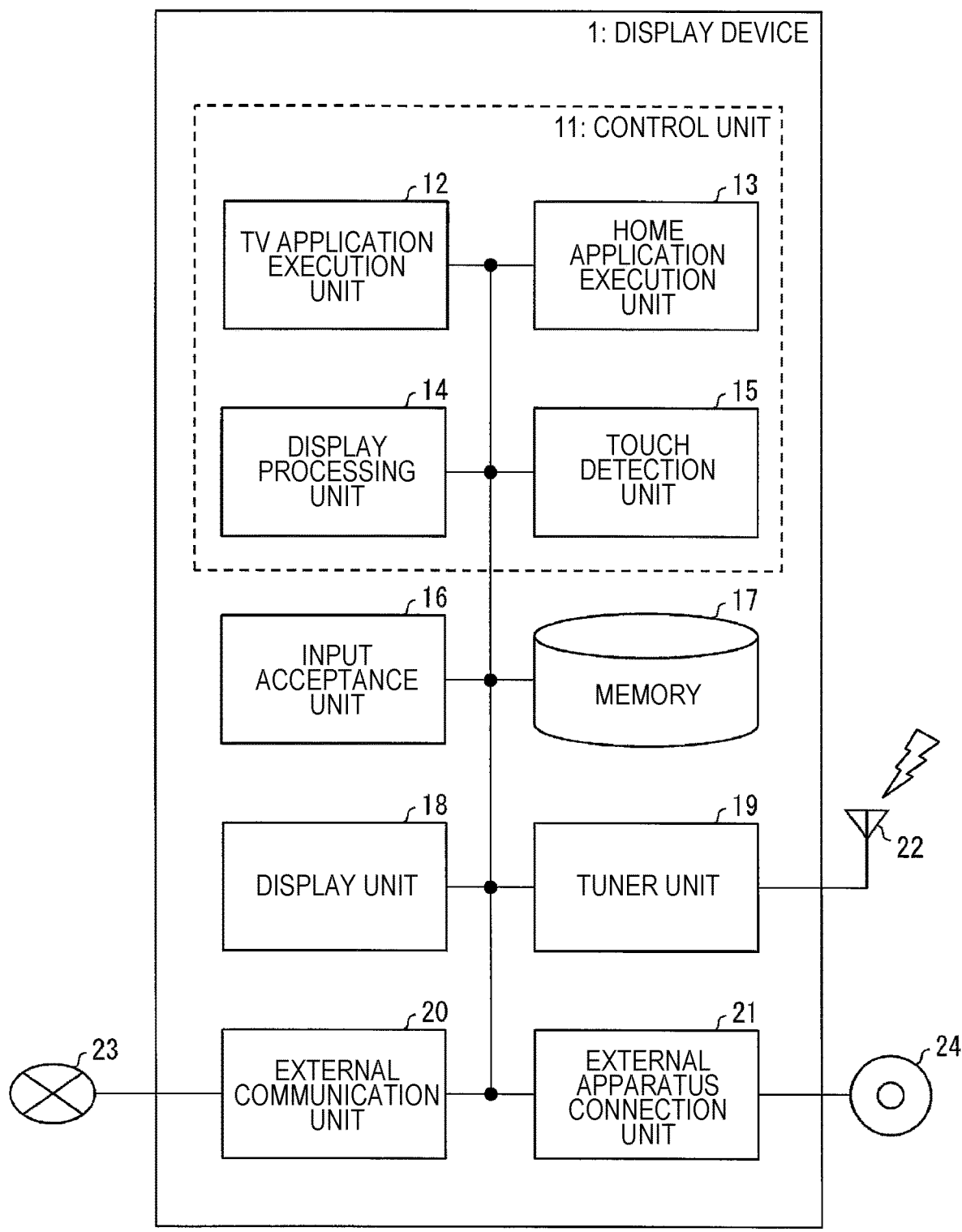
FIG. 1 is a block diagram that illustrates a configuration of a display device according to a first embodiment of the present invention.

A specific configuration of the display device according to this embodiment will be described with reference to FIG. 1. FIG. 1 is a block diagram that illustrates a configuration of a display device 1 according to this embodiment.

As illustrated in FIG. 1, the display device 1 has a control unit 11, an input acceptance unit 16, a memory 17, a display unit 18, a tuner unit 19, an external communication unit 20, and an external apparatus connection unit 21.

The control unit 11 controls actions and processes of the units of the display device 1 and has a TV application execution unit 12, a home application execution unit 13, a display processing unit 14, and a touch detection unit 15.

The input acceptance unit 16 is an input device that accepts an input from a user. The input acceptance unit 16 is a touch panel that is laminated on a surface of the display unit 18 and is integrally formed with the display unit 18, for example.

The memory 17 stores one or plural programs, setting data of the display device 1, and so forth. One or plural programs that are stored in the memory 17 include an operating system (OS), middleware, and so forth for causing the display device 1 to act.

The display unit 18 displays a supplied image in accordance with control by the display processing unit 14. As examples of the display unit 18, a liquid crystal display, an organic electro luminescence (EL) display, a plasma display, and so forth are raised.

The tuner unit 19 is a tuner for receiving broadcast waves such as terrestrial digital broadcasting and satellite broadcasting. The tuner unit 19 is connected with an antenna 22 that receives the broadcast wave.

The external communication unit 20 is used by the display device 1 to perform communication with an external device. The external communication unit 20 is configured to be capable of connecting with a communication network 23 such as the Internet. Note that although not illustrated, between the external communication unit 20 and the communication network 23, a configuration requested for performing communication such as a local area network (LAN) or a router is appropriately provided.

The external apparatus connection unit 21 is an interface of an external apparatus 24 that is connected with the display device 1. As the external apparatus 24, a hard disk drive (HDD), a memory device, or the like is raised, for example.

The home application execution unit 13 included in the control unit 11 starts an application program that is stored in the memory 17 while performing display control of the home screen of the display device 1. The home application execution unit 13 instructs the display processing unit 14 to display the home screen or a display screen of an application.

One of application programs is an application that displays a TV broadcast video acquired from a broadcast wave received by the tuner unit 19 on the display unit 18 (hereinafter also referred to as TV application). The TV application execution unit 12 included in the control unit 11 executes the TV application that is started by the home application execution unit 13. The TV application execution unit 12 instructs the display processing unit 14 to display the TV broadcast video or instructs the display processing unit 14 to stop display of the TV broadcast video.

The display processing unit 14 performs a process to cause the display unit 18 to display an image that is supplied from the TV application execution unit 12, the home application execution unit 13, and so forth. The display processing unit 14 causes the display unit 18 to display the display screen of the TV broadcast video or the TV application that is supplied from the TV application execution unit 12 or causes the display unit 18 to display the home screen that is supplied from the home application execution unit 13.

Here, the home screen supplied by the home application execution unit 13 is the home screen that is slidable by the user, for example, and is the home screen in which one or plural objects are displayed. The display device 1 is capable of displaying the TV broadcast video supplied from the TV application execution unit 12 as one of the objects.

In other words, the display device 1 is capable of displaying the TV broadcast video of the TV application execution unit 12 in a superimposed manner in a state where the home screen of the home application execution unit 13 is displayed. In this case, the display processing unit 14 superimposes the TV broadcast video supplied from the TV application execution unit 12 on the home screen supplied from the home application execution unit 13 and thereby performs a process for generating image data to be displayed on the display unit 18.

Note that the display processing unit 14 performs display by using plural virtual planes (layers) and performs display by using a plane that displays the TV broadcast video supplied from the TV application execution unit 12 and a plane that displays the home screen which includes one or plural objects (however, except the TV broadcast video of the TV application execution unit 12). The plane that displays the TV broadcast video is a higher-level plane than the plane that displays the home screen. Here, "higher-level plane" herein indicates a plane for an image that conceals an image indicated by a lower-level plane. Consequently, because the plane that displays the TV broadcast video is positioned at a higher level than the plane that displays the home screen, in a case where the TV broadcast video overlaps with the objects on the home screen, the TV broadcast video is preferentially displayed when seen from the user.

The touch detection unit 15 detects a touch position by the user in a case where the input acceptance unit 16 accepts an input from the user. In addition, the touch detection unit 15 assesses the contents of a user operation based on the detected touch position. The touch detection unit 15 calculates the change in the touch position by the user, a touch time, and so forth based on the detected touch position and may thereby assess the contents of the user operation (for example, a tap, drag, flick, and so forth).

The touch detection unit 15 refers to the image that is displayed on the display unit 18, detects the object that is displayed on the foremost plane (highest level) in the touch position, and notifies an operation target of the object (for example, the TV application execution unit 12, the home application execution unit 13, or the like) of touch information. Touch information is information that includes the object touched by the user and the contents of the user operation for the object (for example, a tap, drag, flick, and so forth). In such a manner, the touch detection unit 15 changes the notification destination of the touch information in response to the object that is touched by the user.

(Two Display Modes)

The display device 1 according to this embodiment displays one or plural objects on the slidable background. This will be described with reference to FIG. 4 while an example is raised where plural icons are displayed on the home screen (background) configured with plural pages. (a) to (e) in FIG. 4 are diagrams that illustrate screen transition examples in a case where the home screen is slid.

As illustrated in (a) to (e) in FIG. 4, the home screen is configured with five pages, and those five pages are virtually aligned in one horizontal line in the order of (a) to (e). The display unit 18 displays the home screen as one page among the five pages. The user flicks the home screen to the left or right in this state and may thereby slide the home screen to the right adjacent page or the left adjacent page.

For example, the user flicks the home screen to the left in a state where the home screen of (a) in FIG. 4 is displayed, the home screen slides to the left, and the right adjacent home screen of (b) in FIG. 4 is displayed.

Here, on the home screen, an indicator 70 for indicating which page among the five pages is displayed (that is, the position of the home screen that is presently displayed) may be displayed. For example, the pages are represented by the objects such as dots like the indicator 70, the color, tint, size, or the like of the object of the presently displayed page is displayed differently from the other objects, and the presently displayed page may thereby be indicated. In this drawing, the first page is represented by a TV mark, the second to fourth pages are represented by dots, and the object of the presently displayed page is displayed in black.

The display device 1 according to this embodiment has two display modes as display styles of the target object of one or plural objects in a case where one or plural objects are displayed on the slidable background. The two display modes will be described with reference to FIG. 5 to FIG. 7. FIG. 4 is a diagram that illustrates screen display examples of the two display modes. FIG. 6 and FIG. 7 are diagrams that illustrate screen transition examples in a case where the background is slid in respective display modes. In the following, a description will be made while an example is raised where a mini-TV 50 that displays the TV broadcast video is displayed in a superimposed manner in a state where plural icons 52 are displayed on the displayed home screen (background) and the mini-TV 50 is the target object.

The first display mode is a mini-TV home mode (first mode). As illustrated in (a) in FIG. 5, in this mode, the mini-TV 50 that displays the TV broadcast video is displayed while being fixed to a prescribed section 55 in the home screen. Thus, in the mini-TV home mode, in a case where sliding is performed from the home screen illustrated in (a) in FIG. 6 to the next home screen illustrated in (b) in FIG. 6, display of the mini-TV 50 is stopped, and the mini-TV 50 is not displayed on the home screen.

Specifically, in a case where the user performs sliding from the home screen, in which the mini-TV 50 is fixedly displayed, to the next home screen, the input acceptance unit 16 accepts an input by the user. In a case where the input acceptance unit 16 accepts the input, the touch detection unit 15 detects the touch position by the user and assesses that the user performs a slide operation from the change in the touch position.

The touch detection unit 15 refers to the image displayed on the display unit 18 and assesses that the user slides the home screen. Based on this, the touch detection unit 15 notifies the home application execution unit 13 of the touch information that indicates that the user slides the home screen.

Based on the notification from the touch detection unit 15, the home application execution unit 13 instructs the display processing unit 14 to perform display of the next home screen and instructs the TV application execution unit 12 to stop display of the mini-TV 50. The TV application execution unit 12 instructs the display processing unit 14 to stop display of the mini-TV 50 based on the instruction from the home application execution unit 13. Based on the instructions from the TV application execution unit 12 and the home application execution unit 13, the display processing unit 14 causes the display unit 18 to display the next home screen and to stop display of the mini-TV 50.

The second display mode is a mini-TV free mode (second mode). As illustrated in (b) in FIG. 5, in this mode, the mini-TV 50 is not fixed to the prescribed section 55 in the home screen but is displayed while being fixed to a display region of the display unit 18. Thus, in the mini-TV free mode, even in a case where sliding is performed from the home screen illustrated in (a) in FIG. 7 to the next home screen illustrated in (b) in FIG. 7, the mini-TV 50 is displayed in the home screen regardless of whether or not the home screen is slid.

Specifically, in a case where the user performs sliding from the present home screen to the next home screen, the input acceptance unit 16 accepts an input by the user. In a case where the input acceptance unit 16 accepts the input, the touch detection unit 15 detects the touch position by the user and assesses that the user performs the slide operation from the change in the touch position.

The touch detection unit 15 refers to the image displayed on the display unit 18 and assesses that the user slides the home screen. Based on this, the touch detection unit 15 notifies the home application execution unit 13 of the touch information that indicates that the user slides the home screen.

Based on the notification from the touch detection unit 15, the home application execution unit 13 instructs the display processing unit 14 to perform display of the next home screen. In this case, because the TV application execution unit 12 displays the mini-TV 50 in the mini-TV free mode, the TV application execution unit 12 continues to display the mini-TV 50 regardless of presence or absence of a display instruction or a display stopping instruction about the mini-TV 50 from the home application execution unit 13. Thus, the display processing unit 14 causes the display unit 18 to display a screen in which the mini-TV 50 is superimposed on the next home screen.

The mini-TV home mode is the display mode that is preferable for a case where the user desires to focus on viewing and listening to TV, and the mini-TV free mode is the display mode that is preferable for a case where the user desires to view and listen to TV while using another application. Those two display modes are switchable at a desired timing.

Further, because the mini-TV 50 is fixed to the prescribed section 55 in the mini-TV home mode, an image of the home screen (background) is created such that the image corresponds to the prescribed section 55, and a display design in which the mini-TV 50 matches the home screen (background) may thereby be realized.

(Mode Switching 1)

In the following, a switching method between the two display modes will be described. First, switching from the mini-TV home mode to the mini-TV free mode will be described with reference to FIG. 8 and FIG. 9. FIG. 8 is a diagram that illustrates screen transition examples in a case of switching from the mini-TV home mode to the mini-TV free mode, and FIG. 9 is a flowchart that illustrates switching procedures from the mini-TV home mode to the mini-TV free mode.

In a case where switching from the mini-TV home mode to the mini-TV free mode is performed, the user inputs an operation for moving the mini-TV 50 on the home screen. The operation for moving the mini-TV 50 is an operation such as holding down the mini-TV 50 on the home screen in a case where the input acceptance unit 16 is a touch panel and is an operation such as dragging the mini-TV 50 by a mouse or selecting a command for moving the mini-TV 50 from a pop-up menu that is called by operating the mouse (for example, right-clicking or the like) in a case where the input acceptance unit 16 is a mouse, for example.

In the following, as for one example of the operation for moving the mini-TV 50 on the home screen, a description will be made while a case where the user holds down the mini-TV 50 on the home screen is raised as an example ((a) in FIG. 8). In a case where the user holds down the mini-TV 50 on the home screen, the input acceptance unit 16 accepts an input by the user. In a case where the input acceptance unit 16 accepts the input, the touch detection unit 15 detects the touch position by the user, calculates the change in the touch position by the user, the touch time, and so forth, and assesses the contents of the user operation.

The touch detection unit 15 refers to the image displayed on the display unit 18 (that is, an image in which the broadcast video supplied from the TV application execution unit 12 is superimposed on the home screen supplied from the home application execution unit 13) and assesses that the user selects the mini-TV 50 on the home screen (step S11; hereinafter abbreviated as S11).

In addition, in a case where the user touches the same part for a prescribed time or more, the touch detection unit 15 assesses that the user selects the mini-TV 50 on the home screen for a prescribed time or more (YES in S12), that is, the user holds down the mini-TV 50, based on the change in the touch position by the user, the touch time, and so forth. Based on this, the touch detection unit 15 notifies the TV application execution unit 12 of the touch information that indicates that the user holds down the mini-TV 50.

The TV application execution unit 12 switches the display mode to the mini-TV free mode based on the notification from the touch detection unit 15.

Specifically, the TV application execution unit 12 instructs the display processing unit 14 to display an action in which the mini-TV 50 moves off from the prescribed section 55 on the home screen. Based on the instruction from the TV application execution unit 12, the display processing unit 14 causes the display unit 18 to display the action in which the mini-TV 50 moves off from the prescribed section 55 on the home screen ((b) in FIG. 8).

At the same time as this, the user is enabled to drag the mini-TV 50 in a state where the mini-TV 50 is selected. In a case where the user drags the mini-TV 50, the input acceptance unit 16 accepts an input by the user. In a case where the input acceptance unit 16 accepts the input, the touch detection unit 15 detects the touch position by the user, calculates the change in the touch position by the user, the touch time, and so forth, and assesses the contents of the user operation.

The touch detection unit 15 refers to the image displayed on the display unit 18, assesses that the user drags the mini-TV 50 on the home screen based on the change in the touch position, and assesses the locus of the drag by the user on the home screen. Based on this, the touch detection unit 15 notifies the TV application execution unit 12 of the touch information that includes information which indicates that the user drags the mini-TV 50 on the home screen and information of the locus of the drag by the user on the home screen.

Based on the notification from the touch detection unit 15, the TV application execution unit 12 instructs the display processing unit 14 to display an action in which the mini-TV 50 is dragged along the locus of the drag by the user on the home screen.

Based on the instruction from the TV application execution unit 12, the display processing unit 14 causes the display unit 18 to display the action in which the mini-TV 50 is dragged along the locus of the drag by the user on the home screen. In such a manner, in a case where the display mode is shifted to the mini-TV free mode, the mini-TV 50 may be moved to a desired position on the home screen ((c) in FIG. 8).

As described above, switching from the mini-TV home mode to the mini-TV free mode may be performed only by holding down the mini-TV 50. Consequently, in the display device 1 according to this embodiment, the user may perform mode switching by an easy action.

(Mode Switching 2)

Next, switching from the mini-TV free mode to the mini-TV home mode will be described with reference to FIG. 10 and FIG. 11. FIG. 10 is a diagram that illustrates screen transition examples in a case of switching from the mini-TV free mode to the mini-TV home mode, and FIG. 11 is a flowchart that illustrates switching procedures from the mini-TV free mode to the mini-TV home mode.

In a case where switching from the mini-TV free mode to the mini-TV home mode is performed, the user inputs an operation for moving the mini-TV 50 on the home screen. In the following, as for one example of the operation for moving the mini-TV 50 on the home screen, a description will be made while a case where the user touches and drags the mini-TV 50 on the home screen is raised as an example ((a) in FIG. 10). In a case where the user touches the mini-TV 50 on the home screen, the input acceptance unit 16 accepts an input by the user. In a case where the input acceptance unit 16 accepts the input, the touch detection unit 15 detects the touch position by the user, calculates the change in the touch position by the user, the touch time, and so forth, and assesses the contents of the user operation.

The touch detection unit 15 refers to the image displayed on the display unit 18 (that is, an image in which the broadcast video supplied from the TV application execution unit 12 is superimposed on the home screen supplied from the home application execution unit 13) and assesses that the user selects the mini-TV 50 on the home screen (S21).

In addition, the touch detection unit 15 assesses that the user drags the mini-TV 50 on the home screen based on the change in the touch position by the user (S22) and assesses the locus of the drag by the user on the home screen. Based on this, the touch detection unit 15 notifies the TV application execution unit 12 of the touch information that includes information which indicates that the user drags the mini-TV 50 on the home screen and information of the locus of the drag by the user on the home screen.

Based on the notification from the touch detection unit 15, the TV application execution unit 12 instructs the display processing unit 14 to display an action in which the mini-TV 50 is dragged along the locus of the drag by the user on the home screen. Based on the instruction from the TV application execution unit 12, the display processing unit 14 causes the display unit 18 to display the action in which the mini-TV 50 is dragged along the locus of the drag by the user on the home screen ((b) in FIG. 10).

In this case, the TV application execution unit 12 assesses whether or not an operation for moving the mini-TV 50 into a prescribed region 65 in the home screen is accepted from the user. The prescribed region 65 is a region that includes the prescribed section 55 and a prescribed peripheral region of the prescribed section 55. Note that position information (for example, coordinate information) of the prescribed region 65 is in advance notified from the home application execution unit 13 to the TV application execution unit 12.

In a case where the position of the mini-TV 50 at a time when the drag by the user is finished is present in the prescribed region 65 in the home screen, the TV application execution unit 12 assesses that the operation for moving the mini-TV 50 into the prescribed region 65 in the home screen is accepted from the user. In a case where the TV application execution unit 12 assesses that the operation for moving the mini-TV 50 into the prescribed region 65 in the home screen is accepted from the user (YES in S23), the TV application execution unit 12 switches the display mode to the mini-TV home mode.

Specifically, the TV application execution unit 12 instructs the display processing unit 14 to display an action in which the mini-TV 50 fits in the prescribed section 55 on the home screen like being drawn into the prescribed section 55. Based on the instruction from the TV application execution unit 12, the display processing unit 14 causes the display unit 18 to display the action in which the mini-TV 50 fits in the prescribed section 55 on the home screen like being drawn into the prescribed section 55 ((c) in FIG. 10).

As described above, switching from the mini-TV free mode to the mini-TV home mode may be performed only by moving the mini-TV 50 into the prescribed region 65. Consequently, in the display device 1 according to this embodiment, the user may perform mode switching by an easy action.

Note that because the TV application execution unit 12 causes the memory 17, for example, to store information of the present display mode, the TV application execution unit 12 and the home application execution unit 13 refer to the information of the display mode that is stored in the memory 17 and may thereby recognize the present display mode.

In the above, the configuration is described in which the mini-TV 50 is actually dragged and moved. However, the present invention is not necessarily limited to this. For example, in a case where the user inputs an operation for moving the mini-TV 50 on the home screen, the TV application execution unit 12 causes the display processing unit 14 to display frame lines (for example, frame lines that are displayed with broken lines or the like) that correspond to the mini-TV 50, the user drags the frame lines to a desired position and finishes dragging, and the mini-TV 50 may thereby be displayed in the position of the frame lines at a time when the drag is finished.

In this case, when the user drags the frame lines into the prescribed region 65 and finishes dragging, switching from the mini-TV free mode to the mini-TV home mode is performed at a time point when the user finishes dragging the frame lines, and at the same time the mini-TV 50 is displayed in the prescribed section 55.

(Supplementary Configuration)

In the following, a description will be made about supplementary configurations that may be included in the display device 1.

<Supplementary Configuration-1>

In a case where an operation for displaying the home screen of the display device 1 is performed during execution of an application by full screen display, the display mode of the mini-TV 50 preferably does not change from the display mode at a time before the execution of the application. The operation for displaying the home screen is an operation such as pressing a home button for displaying the home screen, for example. This will be described with reference to FIG. 12 and FIG. 13 while a case where an operation for pressing the home button for displaying the home screen is performed as the operation for displaying the home screen is raised as an example. FIG. 12 and FIG. 13 are diagrams that illustrate screen transition examples in a case where the home button of the display device 1 is pressed during execution of an application by full screen display in the respective display modes.

<<Mini-TV Home Mode>>

As illustrated in (a) in FIG. 12, in a case where the home button is pressed during execution of an application by full screen display, the display returns to the home screen that is displayed on the display unit 18 before the execution of the application. Here, in the display device 1, in a case where the display mode at a time before the execution of the application is the mini-TV home mode, the display returns to the home screen that is displayed on the display unit 18 before the execution of the application while the mini-TV home mode is maintained.

For example, in a case where the application is executed from the home screen in which the mini-TV 50 is fixedly displayed and the user presses the home button, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user presses the home button. Based on this, the touch detection unit 15 notifies an operation target of the home button (for example, an execution unit of the application that is being executed) of the touch information that indicates that the user presses the home button. Note that there may be a case where the home button is not displayed on the home screen but is mounted as a hardware-like home button on a frame or the like of the display device 1. In this case, information that the home button is pressed down is notified to the operation target of the home button.

Based on the notification from the touch detection unit 15, the operation target of the home button instructs the home application execution unit 13 to perform display of the home screen at a time before the execution (that is, the home screen in which the mini-TV 50 is fixedly displayed). Based on this, the home application execution unit 13 instructs the display processing unit 14 to perform display of the home screen at a time before the execution (that is, the home screen in which the mini-TV 50 is fixedly displayed) and instructs the TV application execution unit 12 to display the mini-TV 50.

Based on the instruction from the home application execution unit 13, the TV application execution unit 12 instructs the display processing unit 14 to perform display while superimposing the mini-TV 50 on the home screen of the home application execution unit 13. Note that it is assumed that the screen that is displayed by the display unit 18 before the execution of the application and information of the present display mode are stored in the memory 17, for example.

Based on the instructions from the TV application execution unit 12 and the home application execution unit 13, the display processing unit 14 causes the display unit 18 to display a screen in which the mini-TV 50 is superimposed on the home screen at a time before the execution of the application. In such a manner, as illustrated in (b) in FIG. 12, the display returns to the home screen in which the mini-TV 50 is fixedly displayed in the home screen.

Note that as "supplementary configuration-6" that will be described later, in a case where the user is capable of selecting whether or not the mini-TV 50 is displayed on the home screen and a setting for not displaying the mini-TV 50 on the home screen is set, the home application execution unit 13 instructs the display processing unit 14 to perform display of the home screen at a time before the execution of the application but does not instruct the TV application execution unit 12 to display the mini-TV 50.

Meanwhile, in a case where the application is executed from the other home screen than the home screen in which the mini-TV 50 is fixedly displayed and the user presses the home button, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user presses the home button. Based on this, the touch detection unit 15 notifies the operation target of the home button (for example, the execution unit of the application that is being executed) of the touch information that indicates that the user presses the home button. Note that in a case where the home button is mounted as a hardware-like home button, information that the home button is pressed down is notified to the operation target of the home button.

Based on the notification from the touch detection unit 15, the operation target of the home button instructs the home application execution unit 13 to perform display of the home screen at a time before the execution of the application (that is, the home screen in which the mini-TV 50 is not fixedly displayed). In this case, the home application execution unit 13 instructs the display processing unit 14 to perform display of the home screen at a time before the execution of the application (that is, the home screen in which the mini-TV 50 is not fixedly displayed) but does not instruct the TV application execution unit 12 to display the mini-TV 50 because the mini-TV 50 is not fixedly displayed in the home screen at a time before the execution of the application.

The display processing unit 14 causes the display unit 18 to display the home screen at a time before the execution of the application based on the instruction from the home application execution unit 13. In such a manner, as illustrated in (c) in FIG. 12, the display returns to the home screen in which the mini-TV 50 is not fixedly displayed in the home screen. Accordingly, even in a case where the application is finished, the display mode at a time before the execution of the application may be maintained.

<<Mini-TV Free Mode>>

As illustrated in (a) in FIG. 13, in a case where the home button is pressed during the execution of the application by full screen display in a state where the mini-TV 50 is displayed in the mini-TV free mode, in the display device 1, the display returns to the home screen that is displayed on the display unit 18 before the execution of the application while the mini-TV free mode is maintained in a case where the display mode at a time before the execution of the application is the mini-TV free mode.

For example, in a case where the user presses the home button during the execution of the application by full screen display, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user presses the home button. Based on this, the touch detection unit 15 notifies the operation target of the home button (for example, the execution unit of the application that is being executed) of the touch information that indicates that the user presses the home button. Note that in a case where the home button is mounted as a hardware-like home button, information that the home button is pressed down is notified to the operation target of the home button.

Based on the notification from the touch detection unit 15, the operation target of the home button instructs the home application execution unit 13 to perform display of the home screen at a time before the execution of the application. In this case, the home application execution unit 13 instructs the display processing unit 14 to perform display of the home screen at a time before the execution of the application. However, the TV application execution unit 12 provides no instruction for the display processing unit 14 because the mini-TV 50 is displayed on the display screen during the execution of the application. As a result, the mini-TV 50 is displayed on the display screen without any change.

Based on the instruction from the TV application execution unit 12, the display processing unit 14 causes the display unit 18 to display a screen in which the mini-TV 50 is superimposed on the home screen at a time before the execution of the application. In such a manner, as illustrated in (b) and (c) in FIG. 13, the display returns to the home screen in which the mini-TV 50 is displayed in the home screen. Accordingly, even in a case where the application is finished, the display mode at a time before the execution of the application may be maintained.

<Supplementary Configuration-2>

In each of the mini-TV home mode and the mini-TV free mode, the action in a case where the mini-TV 50 displayed on the home screen is tapped may be changed. This will be described with reference to FIG. 14 and FIG. 15. FIG. 14 and FIG. 15 are diagrams that illustrate screen transition examples in a case where the mini-TV 50 displayed on the home screen is tapped in the respective display modes.

<<Mini-TV Home Mode>>

In the mini-TV home mode, as illustrated in (a) in FIG. 14, in a case where the user taps the mini-TV 50 displayed on the home screen, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user taps the mini-TV 50 on the home screen. Based on this, the touch detection unit 15 notifies the TV application execution unit 12 of the touch information that indicates that the user taps the mini-TV 50 on the home screen.

Based on the notification from the touch detection unit 15, the TV application execution unit 12 instructs the display processing unit 14 to perform full screen display of the TV broadcast video. Based on the instruction from the TV application execution unit 12, the display processing unit 14 causes the display unit 18 to perform full screen display of the TV broadcast video.

In such a manner, in the mini-TV home mode, in a case where the mini-TV 50 displayed on the home screen is tapped, a setting in which full screen display of a TV broadcast video 50' is performed may be made as illustrated in (b) in FIG. 14.

<<Mini-TV Free Mode>>

In the mini-TV free mode, as illustrated in (a) in FIG. 15, in a case where the user taps the mini-TV 50 displayed on the home screen, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user taps the mini-TV 50 on the home screen. Based on this, the touch detection unit 15 notifies the TV application execution unit 12 of the touch information that indicates that the user taps the mini-TV 50 on the home screen.

Based on the notification from the touch detection unit 15, the TV application execution unit 12 instructs the display processing unit 14 to display an operation panel for a mini-TV on the mini-TV 50. Based on the instruction from the TV application execution unit 12, the display processing unit 14 causes the display unit 18 to display the operation panel for the mini-TV on the mini-TV 50.

In such a manner, in the mini-TV free mode, in a case where the mini-TV 50 displayed on the home screen is tapped, a setting in which the operation panel for the mini-TV is displayed on the mini-TV 50 may be made as illustrated in (b) in FIG. 15. In this drawing, as the operation panel for the mini-TV, a panel 50a in which a switching button for performing switching to full screen display and channel selection buttons for performing channel-up/down operations and a panel 50b in which a close button for closing the mini-TV 50 is displayed are displayed.

<Supplementary Configuration-3>

In each of the mini-TV home mode and the mini-TV free mode, the action in a case where the icon folder displayed on the home screen is expanded or enlarged may be changed. This will be described with reference to FIG. 16 and FIG. 17. FIG. 16 and FIG. 17 are diagrams that illustrate screen transition examples in a case where the icon folder displayed on the home screen is tapped in the respective display modes. Note that an icon folder is a folder that collectively stores plural icons and is displayed, for example, in the same size as another icon on the home screen. However, the size of the icon folder is not limited to this but may be in a larger or smaller size than the other icons.

<<Mini-TV Home Mode>>

As illustrated in (a) in FIG. 16, in a case where an operation for expanding or enlarging an icon folder 53 displayed on the home screen is input, an icon folder 53' that is the expanded or enlarged icon folder 53 is displayed as illustrated in (b) in FIG. 16. In this case, in the display device 1, in a case where at least a portion of the icon folder 53' that results from expansion or enlargement overlaps with at least a portion of the mini-TV 50, display of the mini-TV 50 is stopped, and the icon folder 53' is preferentially displayed. In the following, as for one example of the operation for expanding or enlarging the icon folder 53 on the home screen, a description will be made while a case where the user taps the icon folder 53 on the home screen is raised as an example.

In a case where the user taps the icon folder 53 displayed on the home screen, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user taps the icon folder 53 on the home screen. Based on this, the touch detection unit 15 notifies the home application execution unit 13 of the touch information that indicates that the user taps the icon folder 53 on the home screen.

The home application execution unit 13 assesses whether or not at least a portion of the icon folder 53' that is the expanded or enlarged icon folder 53 overlaps with at least a portion of the mini-TV 50 on the home screen (that is, the prescribed section 55 on the home screen). In a case where at least a portion of the icon folder 53' overlaps with at least a portion of the mini-TV 50, the home application execution unit 13 instructs the display processing unit 14 to display the icon folder 53' on the home screen and instructs the TV application execution unit 12 to stop display of the mini-TV 50.

Based on the instructions from the TV application execution unit 12 and the home application execution unit 13, the display processing unit 14 causes the display unit 18 to display the icon folder 53' on the home screen and to stop display of the mini-TV 50. In this configuration, even in a case where an expanded or enlarged object is superimposed on the mini-TV 50, the expanded or enlarged object may be viewed with no problem.

Note that in a case where the icon folder 53' does not overlap with the mini-TV 50, the home application execution unit 13 may only instruct the display processing unit 14 to display the icon folder 53' on the home screen. In this case, the mini-TV 50 continues to be displayed without any change.

<<Mini-TV Free Mode>>

As illustrated in (a) in FIG. 17, in a case where the user inputs the operation for expanding or enlarging the icon folder 53 displayed on the home screen, the icon folder 53' that is the expanded or enlarged icon folder 53 is displayed as illustrated in (b) in FIG. 17. In this case, in the display device 1, regardless of whether or not at least a portion of the icon folder 53' that results from expansion or enlargement overlaps with at least a portion of the mini-TV 50, the mini-TV 50 continues to be displayed. In this case, because the plane that displays the mini-TV 50 is a higher-level plane than the plane that displays the home screen, the mini-TV 50 is preferentially displayed on the display unit 18 to the icon folder 53'. In the following, as for one example of the operation for expanding or enlarging the icon folder 53 on the home screen, a description will be made while a case where the user taps the icon folder 53 on the home screen is raised as an example.

In a case where the user taps the icon folder 53 displayed on the home screen, similarly to the case of the mini-TV home mode, the touch detection unit 15 assesses that the user taps the icon folder 53 on the home screen. Based on this, the touch detection unit 15 notifies the home application execution unit 13 of the touch information that indicates that the user taps the icon folder 53 on the home screen.

Based on the notification from the touch detection unit 15, the home application execution unit 13 instructs the display processing unit 14 to display the icon folder 53' that is the expanded or enlarged icon folder 53 on the home screen. In this case, because the TV application execution unit 12 displays the mini-TV 50 in the mini-TV free mode, the TV application execution unit 12 continues to display the mini-TV 50 regardless of presence or absence of the display instruction or the display stopping instruction about the mini-TV 50 from the home application execution unit 13.

Thus, the display processing unit 14 causes the display unit 18 to display the icon folder 53' on the home screen based on the instruction from the home application execution unit 13. However, as described above, because the plane that displays the mini-TV 50 is a higher-level plane than the plane that displays the home screen, the mini-TV 50 is preferentially displayed on the display unit 18 to the icon folder 53'. In this configuration, because the mini-TV 50 may be moved in a case where the expanded or enlarged object is superimposed on the mini-TV 50, there is no problem even in a case where the mini-TV 50 is preferentially displayed to the expanded or enlarged object.

Note that in this action, in a case where display of the mini-TV 50 is stopped on the display unit 18, the output of TV sound may be stopped, or the output of the TV sound may be continued.

<Supplementary Configuration-4>

In each of the mini-TV home mode and the mini-TV free mode, the action in a case where the icon displayed on the home screen is moved may be changed. This will be described with reference to FIG. 18 and FIG. 19. FIG. 18 and FIG. 19 are diagrams that illustrate screen transition examples in a case where the icon displayed on the home screen is moved in the respective display modes.

<<Mini-TV Home Mode>>

In the display device 1, in a case where the user inputs an operation for moving the mini-TV 50 on the home screen, display of the mini-TV 50 is stopped, and an icon 54 is preferentially displayed. In the following, as for one example of the operation for moving the mini-TV 50 on the home screen, a description will be made while a case where the user holds down the mini-TV 50 on the home screen is raised as an example ((a) in FIG. 18). In a case where the user holds down the icon 54 displayed on the home screen, the input acceptance unit 16 accepts an input by the user. The touch detection unit 15 detects the touch position by the user, calculates the change in the touch position by the user, the touch time, and so forth, and assesses the contents of the user operation.

The touch detection unit 15 refers to the image displayed on the display unit 18 and assesses that the user selects the icon 54 on the home screen.

In addition, in a case where the user touches the same part for a prescribed time or more, the touch detection unit 15 assesses that the user selects the icon 54 on the home screen for a prescribed time or more, that is, the user holds down the icon 54, based on the change in the touch position by the user, the touch time, and so forth. Based on this, the touch detection unit 15 notifies the home application execution unit 13 of the touch information that indicates that the user holds down the icon 54.

Based on the notification from the touch detection unit 15, the home application execution unit 13 instructs the TV application execution unit 12 to stop display of the mini-TV 50. The TV application execution unit 12 instructs the display processing unit 14 to stop display of the mini-TV 50.

Subsequently, because the user becomes capable of dragging the icon 54 in a state where the icon 54 is selected, the home application execution unit 13 causes the display processing unit 14 to display an action in which the icon 54 is dragged along the locus of the drag by the user on the home screen ((b) in FIG. 18).

Based on the instructions from the TV application execution unit 12 and the home application execution unit 13, the display processing unit 14 causes the display unit 18 to display the action in which the icon 54 is dragged along the locus of the drag by the user on the home screen and to stop display of the mini-TV 50. In this configuration, even in a case where the object that is moving is superimposed on the mini-TV 50, the object that is moving may be viewed with no problem.

<<Mini-TV Free Mode>>

In the display device 1, in a case where the user inputs an operation for moving the mini-TV 50 on the home screen, display of the mini-TV 50 continues to be displayed even in a case where the icon 54 that is moving is superimposed on the mini-TV 50. In this case, because the plane that displays the mini-TV 50 is a higher-level plane than the plane that displays the home screen, the mini-TV 50 is preferentially displayed on the display unit 18 even in a case where the icon 54 that is moving overlaps with the mini-TV 50. In the following, as for one example of the operation for moving the mini-TV 50 on the home screen, a description will be made while a case where the user holds down the mini-TV 50 on the home screen is raised as an example ((a) in FIG. 18).

In a case where the user holds down the icon 54 displayed on the home screen, similarly to the case of the mini-TV home mode, the touch detection unit 15 assesses that the user holds down the icon 54. Based on this, the touch detection unit 15 notifies the home application execution unit 13 of the touch information that indicates that the user holds down the icon 54.

Based on the notification from the touch detection unit 15, the home application execution unit 13 instructs the display processing unit 14 to display an action in which the icon 54 is dragged along the locus of the drag by the user on the home screen. In this case, because the TV application execution unit 12 displays the mini-TV 50 in the mini-TV free mode, the TV application execution unit 12 continues to display the mini-TV 50 regardless of presence or absence of the display instruction or the display stopping instruction about the mini-TV 50 from the home application execution unit 13.

Thus, the display processing unit 14 causes the display unit 18 to display the action in which the icon 54 is dragged along the locus of the drag by the user on the home screen based on the instruction from the home application execution unit 13. However, as described above, because the plane that displays the mini-TV 50 is a higher-level plane than the plane that displays the home screen, the mini-TV 50 is preferentially displayed on the display unit 18 even in a case where the icon 54 that is moving overlaps with the mini-TV 50. In this configuration, because the mini-TV 50 may be moved in advance in a case where the object is superimposed on the mini-TV 50 during movement of the object, there is no problem even in a case where the mini-TV 50 is preferentially displayed to the object that is moving.

Note that in this action, in a case where display of the mini-TV 50 is stopped on the display unit 18, the output of TV sound may be stopped, or the output of the TV sound may be continued.

<Supplementary Configuration-5>

Also as for display of the mini-TV 50 in a case where an operation for starting an application is performed, the action may be changed in each of the mini-TV home mode and the mini-TV free mode. The operation for starting an application is an operation such as tapping of an icon for starting an application by the user, for example. This will be described with reference to FIG. 20 and FIG. 21 while a case where an operation for tapping an icon for starting an application is performed as the operation for starting the application is raised as an example. FIG. 20 and FIG. 21 are diagrams that illustrate screen transition examples in a case where an application is started in the respective display modes.

<<Mini-TV Home Mode>>

In the mini-TV home mode, as illustrated in (a) in FIG. 20, in a case where the user taps the icon 52 for starting the application, the input acceptance unit 16 accepts an input by the user. The touch detection unit 15 detects the touch position by the user in a case where the input acceptance unit 16 accepts the input.

The touch detection unit 15 refers to the image displayed on the display unit 18 and assesses that the user taps the icon 52 on the home screen. Based on this, the touch information that indicates that the user taps the icon 52 on the home screen is notified to the home application execution unit 13.

Based on the notification from the touch detection unit 15, the home application execution unit 13 reads out the application program that corresponds to the icon 52 from the memory 17 and executes the application program. At the same time as this, the home application execution unit 13 instructs the display processing unit 14 to display the display screen of the started application and instructs the TV application execution unit 12 to stop display of the mini-TV 50. The TV application execution unit 12 instructs the display processing unit 14 to stop display of the mini-TV 50 based on the instruction from the home application execution unit 13.

Based on the instructions from the TV application execution unit 12 and the home application execution unit 13, the display processing unit 14 causes the display unit 18 to perform full screen display of the display screen of the application and to stop display of the mini-TV 50.

In such a manner, in the mini-TV home mode, in a case where the icon 52 displayed on the home screen is tapped to start the application, a setting in which full screen display of the display screen of the started application is performed may be made as illustrated in (b) in FIG. 20. This configuration is preferable in a case where the user desires to focus on use of the application because only the application is displayed in a case where the application is started.

<<Mini-TV Free Mode>>

In the mini-TV free mode, as illustrated in (a) in FIG. 21, in a case where the user taps the icon 52 for starting the application, the input acceptance unit 16 accepts an input by the user. The touch detection unit 15 detects the touch position by the user.

The touch detection unit 15 refers to the image displayed on the display unit 18 and assesses that the user taps the icon 52 on the home screen. Based on this, the touch information that indicates that the user taps the icon 52 on the home screen is notified to the home application execution unit 13.

Based on the notification from the touch detection unit 15, the home application execution unit 13 reads out the application program that corresponds to the icon 52 from the memory 17 and executes the application program. At the same time as this, the home application execution unit 13 instructs the display processing unit 14 to display the display screen of the started application. In this case, because the TV application execution unit 12 displays the mini-TV 50 in the mini-TV free mode, the TV application execution unit 12 continues to display the mini-TV 50 regardless of presence or absence of the display instruction or the display stopping instruction about the mini-TV 50 from the home application execution unit 13. Thus, the display processing unit 14 causes the display unit 18 to perform full screen display of a screen in which the mini-TV 50 is superimposed on the display screen of the application.

In such a manner, in the mini-TV free mode, in a case where the icon 52 displayed on the home screen is tapped to start the application, a setting in which full screen display of the display screen of the started application is performed while the mini-TV 50 is superimposed on the display screen may be made as illustrated in (b) in FIG. 21. This configuration is preferable in a case where the user desires to view and listen to the mini-TV 50 while using the application because the mini-TV 50 is displayed together even in a case where the application is started.

Note that in this action, in a case where display of the mini-TV 50 is stopped on the display unit 18, the output of TV sound is preferably stopped.

<Supplementary Configuration-6>

Whether or not the mini-TV 50 is displayed on the home screen may be set as selectable by the user. For example, in a case where the display device 1 is started for the first time or the like, a selection menu in which a display setting of the mini-TV 50 may be selected may be displayed. FIG. 22 illustrates a display example of the selection menu in which the display setting of the mini-TV 50 may be selected. FIG. 23 is a diagram that illustrates screen display examples that correspond to display settings of the mini-TV 50.

For example, in a case where the display device 1 is started for the first time or the like, the home application execution unit 13 instructs the display processing unit 14 to display the selection menu in which the display setting of the mini-TV 50 may be selected on the home screen. As illustrated in FIG. 22, the display processing unit 14 causes the display unit 18 to display the selection menu on the home screen based on the instruction from the home application execution unit 13.

In FIG. 22, a selection menu 56 is displayed in which displaying the mini-TV 50 in the prescribed section 55 on the home screen (that is, displaying the mini-TV 50 in the mini-TV home mode) or not displaying the mini-TV 50 on the home screen may be selected.

In a case where it is desired to display the mini-TV 50 on the home screen, a selection button 56a is selected, and the input acceptance unit 16 thereby accepts an input by the user. The touch detection unit 15 detects the touch position by the user.

The touch detection unit 15 refers to the image displayed on the display unit 18 and assesses that the user selects the selection button 56a. Based on this, the touch detection unit 15 notifies the home application execution unit 13 of the touch information that indicates that the user selects the selection button 56a.

Based on the notification from the touch detection unit 15, the home application execution unit 13 instructs the display processing unit 14 to display the home screen and instructs the TV application execution unit 12 to display the mini-TV 50. Based on the instruction from the home application execution unit 13, the TV application execution unit 12 instructs the display processing unit 14 to perform display while superimposing the mini-TV 50 on the home screen of the home application execution unit 13.

Based on the instructions from the TV application execution unit 12 and the home application execution unit 13, the display processing unit 14 causes the display unit 18 to display a screen in which the mini-TV 50 is superimposed on the home screen. As a result, as illustrated in (a) in FIG. 23, the mini-TV 50 is displayed in the prescribed section 55 on the home screen.

Further, in a case where the mini-TV 50 is not displayed on the home screen, a selection button 56*b* is selected, and the input acceptance unit 16 thereby accepts an input by the user. The touch detection unit 15 detects the touch position by the user.

The touch detection unit 15 refers to the image displayed on the display unit 18 and assesses that the user selects the selection button 56*b*. Based on this, the touch information that indicates that the user selects the selection button 56*b* is notified to the home application execution unit 13.

Based on the notification from the touch detection unit 15, the home application execution unit 13 instructs the display processing unit 14 to display the home screen. In this case, the home application execution unit 13 does not instruct the TV application execution unit 12 to display the mini-TV 50. Thus, the display processing unit 14 causes the display unit 18 to display the home screen but does not display the mini-TV 50. As a result, as illustrated in (b) in FIG. 23, the mini-TV 50 is not displayed on the home screen. The home application execution unit 13 stores the display setting (display present or no display) of the mini-TV 50 and performs various kinds of notifications to the TV application execution unit 12 in accordance with the setting in subsequent display.

Note that in FIG. 22, the selection menu 56 in which displaying the mini-TV 50 in the mini-TV home mode or not displaying the mini-TV 50 on the home screen may be selected is raised as an example. The present invention is not necessarily limited to this. For example, as one of the selection buttons, a selection button for displaying the mini-TV 50 in the mini-TV free mode may be added to the selection menu 56.

Here, a configuration is possible in which the display setting of the mini-TV 50 may be performed in a state where the home screen is displayed. For example, in a case where a prescribed touch event such as holding down a portion in which the object is not arranged on the home screen is performed when the home screen is displayed on the display unit 18, a selection menu 57 as illustrated in FIG. 24, in which whether or not the mini-TV 50 is displayed may be selected may be displayed on the home screen.

Further, in a case where the setting for displaying the mini-TV 50 is selected in the selection menu 57, a selection menu 58 as illustrated in FIG. 25, in which whether or not a widget for the mini-TV is displayed may be selected, may be displayed on the home screen. A widget for TV is a widget that is supplementarily displayed on the mini-TV 50 such as a widget 51*a* that displays an explanation (such as a program name and a summary) of a presently displayed broadcast program or a widget 51*b* that displays another broadcast program which may presently be viewed and listened to (so-called a competing program).

<Supplementary Configuration-7>

A configuration in which the display setting of the mini-TV 50 may be selected is described in supplementary configuration-6, and an action in a case where a new application is downloaded may be changed in response to the display setting. This will be described with reference to FIG. 26. FIG. 26 is a diagram that illustrates screen display examples in a case where a new application is downloaded in the display settings.

<<Display Setting of Mini-TV Present>>

In a case where the display setting of the mini-TV 50 is present and the user downloads a new application, the home application execution unit 13 instructs the display processing unit 14 to display an icon of the newly downloaded application on the home screen. In this case, as illustrated in (a) in FIG. 26, the home application execution unit 13 instructs the display processing unit 14 to display an icon 59 of the newly downloaded application in a position that does not overlap with the mini-TV 50 on the home screen.

Based on the instruction from the home application execution unit 13, the display processing unit 14 causes the display unit 18 to display the icon 59 of the newly downloaded application in a position that does not overlap with the mini-TV 50. Consequently, unlike a position 59' in (a) in FIG. 26, the icon 59 is not arranged in a position that overlaps with the mini-TV 50.

Note that (a) in FIG. 26 illustrates a case where the display mode is the mini-TV home mode, but a similar action is performed even in the mini-TV free mode or in a state where the mini-TV 50 is not displayed (however, the display setting of the mini-TV 50 is present). Consequently, as illustrated in (b) in FIG. 26, the home application execution unit 13 instructs the display processing unit 14 to display the icon 59 of the newly downloaded application in a position that does not overlap with the prescribed section 55 on the home screen.

In a case where the display setting of the mini-TV 50 is present, it is possible that the mini-TV 50 is arranged in the prescribed section 55 on the home screen. Thus, the icon is arranged on the outside of the prescribed section 55, and the mini-TV 50 may thereby be inhibited from overlapping with the icon even in a case where the mini-TV 50 is arranged in the prescribed section 55.

<<No Display Setting of Mini-TV>>

In a case where no display setting of the mini-TV 50 is present and the user downloads a new application, the home application execution unit 13 instructs the display processing unit 14 to display the icon of the newly downloaded application on the home screen. In this case, there is no restriction on the position in which the home application execution unit 13 displays the icon of the newly downloaded application on the home screen. Consequently, as illustrated in (c) in FIG. 26, the icon of the newly downloaded application may be arranged in a position that overlaps with the prescribed section 55.

In a case where no display setting of the mini-TV 50 is present, the mini-TV 50 is not arranged in the prescribed section 55 on the home screen. Thus, even the icon is arranged in the prescribed section 55, there is not a concern that the mini-TV 50 overlaps with the icon.

<Supplementary Configuration-8>

As illustrated in FIG. 4, in a case where the home screen is configured with plural pages, there is an indicator for indicating which page is displayed (that is, the position of the home screen that is presently displayed). For example, the pages are represented by the objects such as dots like the indicator 70 illustrated in FIG. 4, the color, tint, size, or the like of the object of the presently displayed page is displayed differently from the other objects, and the presently displayed page may thereby be indicated.

A configuration in which the display setting of the mini-TV 50 may be selected is described in supplementary configuration-6, and the indicator that indicates the position of the presently displayed home screen may be made different in response to the display setting. This will be described with reference to FIG. 27. FIG. 27 is a diagram that illustrates display examples of indicators in the display settings.

In a case where the display setting of the mini-TV 50 is present, the home application execution unit 13 instructs the display processing unit 14 to display an indicator for a case where the display setting of the mini-TV 50 is present in an indicator display portion 60 on the home screen, which is illustrated in (a) in FIG. 27. In (a) in FIG. 27, as an object that indicates the position of the first home screen (that is, the home screen in which the mini-TV 50 is displayed in the mini-TV home mode), a TV-shaped object 60*a* is displayed.

In a case where no display setting of the mini-TV 50 is present, the home application execution unit 13 instructs the display processing unit 14 to display an indicator for a case where no display setting of the mini-TV 50 is present in the indicator display portion 60 on the home screen, which is illustrated in (b) in FIG. 27. In (b) in FIG. 27, as the object that indicates the position of the first home screen (that is, the home screen in which the mini-TV 50 is displayed in the mini-TV home mode), a circular object 60*b* is displayed.

Accordingly, presence or absence of the display setting of the mini-TV 50 at the present time may be recognized only by seeing the indicator display portion 60 on the home screen.

<Supplementary Configuration-9>

An object such as a widget of another application may be displayed on the home screen in the two display modes, similarly to the mini-TV 50. That is, another object than the mini-TV 50 may be set as a target object.

For example, the object of another application may be displayed in the two display modes that are the home mode, in which the object of the other application is fixedly displayed in a prescribed section on the home screen and display is stopped in a case where sliding is performed from the home screen to the next home screen, and the free mode, in which the object is fixedly displayed to a display region of the display unit 18 regardless of whether or not the home screen is slid. Action contents and so forth in a case of switching the display modes are similar to the mini-TV 50.

In such a manner, in a case where plural target objects are present, each of the target objects independently has the two display modes, and it is possible to switch the display modes for each of the target objects.

<Supplementary Configuration-10>

In the display device 1, arrangement methods of one or plural objects to be displayed on the home screen are not particularly limited. However, objects may be arranged in accordance with specific rules. For example, a theme is set for each page of the home screen, and objects related to the theme may be arranged on each page. This will be described with reference to FIG. 28. (a) to (d) in FIG. 28 are diagrams that illustrate respective screen display examples of five pages with different themes.

In FIG. 28, daily living situations of the user at home are set as the themes on the respective pages that configure the home screens. Further, on the pages, the objects such as widgets and icons of applications related to the living situations or shortcut icons to related websites are arranged.

For example, on the first page illustrated in (a) in FIG. 28, a theme of "watching TV" is set. On this page, the objects related to the theme of "watching TV", that is, the objects that may be used in watching TV are arranged.

In this drawing, as the objects related to the theme of "watching TV", the mini-TV 50, the widgets 51*a* and 51*b* for the mini-TV, and icons 52*a* to 52*c* of applications that may be used in watching the mini-TV (for example, a TV application, a TV schedule application, and so forth) are displayed.

On the second page illustrated in (b) in FIG. 28, a theme of "use in kitchen" is set. On this page, the objects related to the theme of "use in kitchen", that is, the objects that may be used in being in the kitchen are arranged.

In this drawing, as the objects related to the theme of "use in kitchen", a widget 51*c* that displays contents related to the theme (for example, contents acquired from a website of cooking recipes and so forth or acquired from a cloud) and icons 52*d* and 52*e* of applications that may be used in being in the kitchen (for example, applications for cooking recipe search, a timer, and so forth) are displayed.

On the third page illustrated in (c) in FIG. 28, a theme of "use in living room" is set. On this page, the objects related to the theme of "use in living room", that is, the objects that may be used in being in the living room are arranged.

In this drawing, as the objects related to the theme of "use in living room", widgets 51*d* to 51*g* that display contents acquired from websites related to the theme (for example, websites of a newspaper company, a weather forecast, a railway company, and so forth) and icons 52*f* to 52*j* of applications that may be used in being in the living room (for example, applications for online shopping, an electronic book, a game, and so forth) are displayed.

On the fourth page illustrated in (d) in FIG. 28, a theme of "use in bathroom" is set. On this page, the objects related to the theme of "use in bathroom", that is, the objects that may be used in being in the bathroom are arranged.

In this drawing, as the objects related to the theme of "use in bathroom", icons 52*k* and 52*l* of applications that may be used in being in the bathroom (for example, applications for listening to music, watching a movie, and so forth) are displayed.

On the fifth page illustrated in (e) in FIG. 28, a theme of "use in child room" is set. On this page, the objects related to the theme of "use in child room", that is, the objects that may be used in being in the child room are arranged.

In this drawing, as the objects related to the theme of "use in child room", icons 52*m* and 52*n* of applications that may be used in being in the child room (for example, applications for learning English, learning calculation, and so forth) are displayed.

In such a manner, the objects related to the themes that are set to the respective pages of the home screen are arranged on the respective pages, the objects arranged on the home screen are thereby not scattered, and those objects may be arrayed.

Further, because the pages that correspond to plural themes (for example, the daily living situations of the user at home), the display device 1 may be shared by plural users. Further, because switching among accounts or the like does not have to be performed, the display device 1 may readily be shared by plural users. Further, even in a case where the display device 1 is shared by plural users, the objects arranged on the home screen are arranged while being categorized into the related themes and are thus not scattered.

Particularly, in a case where the display device 1 is a portable tablet terminal, as illustrated in FIG. 28, the daily living situations of the user at home are set as themes on the respective pages of the home screen, and the optimal objects for the use situation in a room (space) into which the user brings the tablet terminal may thereby be displayed. For example, in a case where the user brings the tablet terminal to the kitchen, the page to which the theme of "use in kitchen" is set is displayed, and the optimal objects for use of the display device 1 in the kitchen may thereby be displayed.

Note that themes do not have to be set to all pages that configure the home screen, no theme is set to a portion of the pages (for example, the final page), and a configuration may be made such that the user may arrange preferred objects in a preferred manner of the user.

Further, in FIG. 28, an example is raised where daily living situations of the user at home are set as the themes. However, settable themes are not particularly limited. For example, use situations of the user in an office may be set as themes.

Incidentally, an image that is used for the home screen is not particularly limited. For example, the image may be an illustration image, an image using a photograph, a textile image, or the like as illustrated in FIG. 28.

Further, the image used for the home screen may be configured with plural planes. For example, a first plane that displays a common image on all the pages (for example, an image in which a wall and a floor are displayed) is provided, and on that, second planes that display the images corresponding to the respective pages (for example, images of furniture that correspond to the set themes) may be provided.

Accordingly, the images of the second planes are displayed on the image of the first plane in a superimposed manner. Further, the first plane continuously displays the same image regardless of the displayed page, and the second plane displays the image that corresponds to the displayed page. Consequently, in a case where the user flicks the home screen to the left or right, the images displayed in the second planes are switched.

Note that as the image used for the home screen, the images of designs that match (are associated with) the themes on the respective pages are preferably used as illustrated in FIG. 28. For example, as the image of the page to which the theme of "use in kitchen" is set, the image of the kitchen or an image related to the kitchen may be used. Further, as illustrated in (c) in FIG. 28, in a case where an image in which a shelf or the like is displayed is used, a specification in which the object such as an icon is actually arranged on the shelf in the image may be employed.

(Additional Matters)

The display device according to the present invention may preferably be realized as a tablet terminal, a television receiver, or the like that includes a touch panel as the input acceptance unit. However, the present invention is not necessarily limited to this. For example, the display device according to the present invention may include a remote controller with a touch pad, a mouse with a touch pad, or the like as the input acceptance unit. Further, besides the tablet terminal and the television receiver, the configuration of the display device according to the present invention other than the display unit 18 may be realized as a recorder that includes the remote controller with a touch pad, the mouse with a touch pad, or the like as the input acceptance unit. Alternatively, the configuration of the display device according to the present invention other than the display unit 18 may be realized as a set top box (also referred to as STB). In this case, the input acceptance unit may be the remote controller with a touch pad, the mouse with a touch pad, or the like or may be a touch panel that is included in a television receiver or the like for which the STB is used.

The input acceptance unit may be a remote controller that includes a key such as a directional pad as well as the remote controller with a touch pad. In this case, the operation of the display device is performed by an operation or the like of a cursor or a frame or the like that indicate selection of the object.

Note that the touch detection unit does not detect the touch position by the user but detects the position of the cursor, the position that is focused by the frame which indicates selection of the object, or the like.

Note that FIG. 1 illustrates the display device that includes the tuner unit 19. However, the present invention is not necessarily limited to this. For example, the display device according to the present invention may be provided with the tuner unit as a separate body. In this case, the tuner unit is separately present as a tuner box, and the tuner box also includes an antenna that receives a broadcast wave. This tuner box and the display device are connected together by a wireless LAN or the like, and the TV broadcast video is delivered to the display device by using a system such as DLNA®.

As described above, the objects in this embodiment are targets to be displayed on the display screen of the display device such as icons, widgets, and contents. The contents include home pages, advertisements, still image contents, moving image contents, and so forth on the Internet. Moving contents include TV broadcast videos, streaming contents, and so forth.

Still image contents and moving image contents may be contents stored in the memory 17 or may be contents that are stored in the external apparatus 24 such as an external recording medium or an external input apparatus.

Second Embodiment

In the first embodiment, a description is made about the display device that is capable of switching the two display mode. However, this does not limit the invention described herein. In the following, a description will be made about a display device that may display an object in an appropriate part regardless of presence or absence of a display mode in a case where an object and a content are displayed together while the drawings to be referred to are changed. Note that the same reference characters are given to similar portions to the portions that are already described, and a description thereof will not be made.

(Outline of Display Device)

A display device 3 according to this embodiment displays an object and a content. For example, the display device according to this embodiment may be realized as the tablet terminal 100 such as a smartphone or a tablet personal computer (PC), which are illustrated in FIG. 2, or the television receiver 200, which is illustrated in FIG. 3.

(Configuration of Display Device)

A specific configuration of the display device according to this embodiment will be described with reference to FIG. 29. FIG. 28 is a block diagram that illustrates a configuration of the display device 3 according to this embodiment.

As illustrated in FIG. 29, the display device 3 has a control unit 31, the input acceptance unit (acceptance unit) 16, the memory 17, the display unit 18, the tuner unit 19, the external communication unit 20, and the external apparatus connection unit 21.

The control unit 31 controls actions and processes of the units of the display device 3 and has a TV application execution unit 32, a home application execution unit (adjustment unit) 33, a display processing unit 34, and a touch detection unit 35.

The memory 17 according to this embodiment stores one or plural programs, setting data of the display device 3, and so forth. One or plural programs that are stored in the memory 17 include an operating system (OS), middleware, and so forth for causing the display device 3 to act.

The home application execution unit 33 included in the control unit 31 starts (and executes) an application program that is stored in the memory 17 while performing display control of a home screen of the display device 3. The home application execution unit 33 instructs the display processing unit 34 to display the home screen or a display screen of an application.

One of application programs is an application that displays a TV broadcast video acquired from a broadcast wave received by the tuner unit 19 on the display unit 18 (hereinafter also referred to as TV application). The TV application execution unit 32 included in the control unit 31 executes the TV application that is started by the home application execution unit 33. The TV application execution unit 32 instructs the display processing unit 34 to display the TV broadcast video or instructs the display processing unit 34 to stop display of the TV broadcast video.

Similarly to the display device 1, the display device 3 according to this embodiment displays one or plural objects on the slidable background. Similarly to the display processing unit 14 according to the first embodiment, the display processing unit 34 performs a process for generating an image to be displayed on the display unit 18 from a supplied image or information.

Similarly to the touch detection unit 15, the touch detection unit 35 detects a touch position by the user in a case where the input acceptance unit 16 accepts an input from the user. In addition, the touch detection unit 15 assesses the contents of the input by the user based on the detected touch position.

Action Example 1

Next, an action example 1 of the display device 3 according to the second embodiment of the present invention will be described with reference to FIG. 30. FIG. 30 is a screen configuration diagram that illustrates the action example 1 of the display device 3 according to this embodiment. In the action example 1, in a case where the user performs an operation for opening an icon folder (object) and the opened icon folder is superimposed on a TV video (content), the display device 3 stops display of the TV video.

Note that this action example is not limited to an operation for expanding an icon folder but is applicable to an operation for enlarging an icon, for example. Further, in this action example, in a case where display of the TV video is stopped, the display device 3 may stop the output of TV sound or may continue the output of the TV sound.

As illustrated in (a) in FIG. 30, the display device 3 displays a TV screen 181a and an icon folder 182a on the display unit 18 (screen) such that the TV screen 181a and the icon folder 182a do not overlap with each other. The display device 3 displays the TV video on the TV screen 181a. The icon folder 182a is a folder that includes one or plural icons. In this state, the user may perform an operation for opening the icon folder 182a. The operation for opening the icon folder 182a is performed by tapping, for example.

Note that in (a) in FIG. 30, the display device 3 displays one icon folder 182a but may display plural icon folders. Then, the user performs an operation for expanding or enlarging any of plural icon folders.

In a case where the user performs the operation for opening the icon folder 182a on the display unit 18 illustrated in (a) in FIG. 30, as illustrated in (b) in FIG. 30, the display device 3 expands the icon folder 182a, displays an icon folder 182b, and displays four icons 183 in the icon folder 182b.

In this case, because the icon folder 182b that results from expansion overlaps with the TV video of the TV screen 181a illustrated in (a) in FIG. 30, in (b) in FIG. 30, the display device 3 does not display the TV video on a TV screen 181b, that is, turns off the TV video.

In the display unit 18, a plane of the TV video is different from a plane of the icon folder, and the plane of the TV video is present in the foremost plane. That is, the display device 3 performs display by using plural planes and displays the TV video on a higher-level plane than the plane for displaying the icon folder. Consequently, the display device 3 preferentially displays the TV video in a case where the TV video overlaps with the icon folder. In this case, in order to display the whole icon folder, the display device 3 preferably turns off the TV video and makes the plane of the TV video transparent.

Note that in a case where the icon folder 182b that results from expansion does not overlap with the TV video of the TV screen 181a, the display device 3 is capable of displaying the icon folder 182b and the TV video of the TV screen 181a on the respective planes and thus continues a state where the TV video is displayed without turning off the TV video. A determination about whether or not the icon folder 182b overlaps with the TV video of the TV screen 181a is performed by the home application execution unit 33 that is capable of acquiring the display coordinates of a mini-TV home and displays the expanded icon folder.

Next, display control in which the display device 3 causes a transition from the display state in (a) in FIG. 30 to the display state in (b) in FIG. 30 in the display unit 18 will be described in detail with reference to FIG. 29 and FIG. 30.

First, the user taps the icon folder 182a displayed on the display unit 18, which is illustrated in (a) in FIG. 30. In the display device 3, the input acceptance unit 16 accepts the tap, and the touch detection unit 35 assesses that the touch position is included in a range of the icon folder 182a based on the position of the tap on the screen and assesses that the user performs a tap operation because the touch position is one part and the touch continuation time is less than a prescribed value. The touch detection unit 35 notifies the home application execution unit 33 of the touch information that indicates that the user performs the tap operation to the icon folder 182a.

The home application execution unit 33 accepts the above touch information notification from the touch detection unit 35 and recognizes that the icon folder 182a is tapped. Next, the home application execution unit 33 calculates the range in which the icon folder 182b which is the icon folder 182a in an expanded state is displayed (for example, the coordinates of four apexes, the coordinates of one apex and the vertical and horizontal lengths, or the like). Then, the home application execution unit 33 supplies data of the home screen that includes the image of the icon folder 182b which results from expansion to the display processing unit 34. Then, the home application execution unit 33 acquires a display range (for example, the coordinates of four apexes, the coordinates of one apex and the vertical and horizontal lengths, or the like) of the TV screen 181a from the memory 17 or the TV application execution unit 32. In addition, the home application execution unit 33 assesses whether or not the calculated display range of the icon folder 182b overlaps with the acquired display range of the TV screen 181a. In a case where the display range of the icon folder 182b overlaps with the display range of the TV screen 181a, the home application execution unit 33 instructs the TV application execution unit 32 to stop supply of the TV video.

In a case where the TV application execution unit 32 accepts the instruction to stop supply of the TV video from the home application execution unit 33, the TV application execution unit 32 stops supply of the TV video to the display processing unit 34. On the other hand, in a case where the TV application execution unit 32 does not accept the instruction to stop supply of the TV video from the home application execution unit 33, the TV application execution unit 32 continues supply of the TV video to the display processing unit 34.

The display processing unit 34 acquires the data of the home screen from the home application execution unit 33 and instructs the display unit 18 to display the home screen. Further, the display processing unit 34 instructs the display unit 18 to display the TV video supplied from the TV application execution unit 32 but does not instruct the display unit 18 to display the TV video in a case where the TV video is not supplied from the TV application execution unit 32.

The display unit 18 displays the home screen and the TV video in accordance with the instruction from the display processing unit 34 but does not perform display of the TV video in a case where the instruction to display the TV video is not provided from the display processing unit 34.

Based on the above, in the display device 3, in a case where the operation for expanding the icon folder 182a is performed and at least a portion of the icon folder 182b that results from expansion is superimposed on at least a portion of the TV video of the TV screen 181a, the display device 3 stops display of the TV video. Accordingly, even in a case where a portion of or the whole icon folder 182b that results from expansion overlaps with the TV video, the whole icon folder 182b may be displayed. Consequently, in a case where the icon folder is displayed together with the TV video, the icon folder may appropriately be displayed.

Action Example 2

Next, an action example 2 of the display device 3 according to the second embodiment of the present invention will be described with reference to FIG. 31. FIG. 31 is a screen configuration diagram that illustrates the action example 2 of the display device 3 according to this embodiment. In the action example 2, in a case where in order to move an icon (object), an operation for moving the icon by the user is accepted, the display device 3 stops display of the TV video (content).

Note that this action example is not limited to an operation for moving an icon but is applicable to an operation for moving an icon folder, for example. Further, in this action example, in a case where display of the TV video is stopped, the display device 3 may stop the output of TV sound or may continue the output of the TV sound.

As illustrated in (a) in FIG. 31, the display device 3 displays the TV screen 181a and an icon 184 on the display unit 18 (screen) such that the TV screen 181a and the icon 184 do not overlap with each other. The display device 3 displays the TV video on the TV screen 181a. The icon 184 is used for starting or the like of an application. In this state, the user inputs an operation for moving the icon 184. The operation for moving the icon 184 is an operation such as holding down the icon 184 on the home screen in a case where the input acceptance unit 16 is a touch panel and is an operation such as dragging the icon 184 by a mouse or selecting a command for moving the icon 184 from a pop-up menu that is called by operating the mouse (for example, right-clicking or the like) in a case where the input acceptance unit 16 is a mouse, for example.

In the following, as for one example of the operation for moving the icon 184 on the home screen, a description will be made while a case where the user holds down the icon 184 on the home screen is raised as an example. An operation for holding down the icon 184 may be performed by a finger of the user or may be performed by using a stylus or the like.

Note that in (a) in FIG. 31, the display device 3 displays one icon 184 but may display plural icons. Then, in order to move any of plural icons, the user performs an operation for holding down the icon.

In a case where the user continues an operation for pressing the icon 184 for a prescribed time or more on the display unit 18 illustrated in (a) in FIG. 31, as illustrated in (b) in FIG. 31, the display device 3 does not display the TV video on the TV screen 181b, that is, turns off the TV video.

In the display unit 18, the plane of the TV video is different from the plane of the icon folder, and the plane of the TV video is present in the foremost plane. That is, the display device 3 performs display by using plural planes and displays the TV video on a higher-level plane than the plane for displaying the icon folder. Consequently, the display device 3 preferentially displays the TV video in a case where the TV video overlaps with the icon folder.

Meanwhile, because the icon 184 is held down by the user, the icon 184 possibly moves to an arbitrary part and may overlap with the TV video of the TV screen 181a. In order to continue display of the whole icon 184 that moves to an arbitrary part in response to an operation by the user, the display device 3 preferably makes the plane of the TV video transparent, turns off the plane itself, or turns of the TV video.

Next, display control in which the display device 3 causes a transition from the display state in (a) in FIG. 31 to the display state in (b) in FIG. 31 in the display unit 18 will be described in detail with reference to FIG. 29 and FIG. 31.

First, the user holds down the icon 184 displayed on the display unit 18, which is illustrated in (a) in FIG. 31. In the display device 3, the input acceptance unit 16 accepts the holding down, and the touch detection unit 35 detects the touch position on the screen that is related to the holding down and the touch continuation time. In a case where the touch detection unit 35 assesses that the touch position is included in the range of the icon 184, the touch position is one part, and the touch continuation time is a prescribed value or more, the touch detection unit 35 notifies the home application execution unit 33 of the touch information that indicates that the user holds down the icon 184.

The home application execution unit 33 accepts the touch information that indicates that the icon 184 is held down and notifies the TV application execution unit 32 to stop display of the TV video of the TV screen 181a.

The TV application execution unit 32 accepts the notification to stop display of the TV video from the home application execution unit 33 and stops supply of the TV video to the display processing unit 34.

In a case where the TV video is not supplied from the TV application execution unit 32, the display processing unit 34 does not instruct the display unit 18 to display the TV video.

The display unit 18 does not perform display of the TV video because an instruction for displaying the TV video is not provided from the display processing unit 34.

Based on the above, in the display device 3, in a case where in order to move the icon 184, the operation for moving the icon 184 is accepted, the display device 3 stops display of the TV video of the TV screen 181*a*. Accordingly, even in a case where the icon 184 is moved and overlaps with the TV screen 181*b*, the whole icon 184 may be displayed. Consequently, in a case where the icon is displayed together with the TV video, the icon may appropriately be displayed.

Action Example 3

Next, an action example 3 of the display device 3 according to the second embodiment of the present invention will be described with reference to FIG. 32. FIG. 32 is a screen configuration diagram that illustrates the action example 3 of the display device 3 according to this embodiment. The action example 3 is an action example where the display device 3 adjusts the display position of an icon such that the icon (target object) that represents an application which is newly installed by the user does not overlap with the TV video (content).

Note that this action example is not limited to the adjustment of the display position of the icon that represents the newly installed application but is applicable to adjustment of a display position of an icon folder that includes respective icons which represent plural applications which are collectively installed, for example.

As illustrated in (a) in FIG. 32, the display device 3 displays the TV screen 181*a* on the display unit 18 (screen) and displays the TV video on the TV screen 181*a*.

In a case where the user installs an application in the display device 3 in the display unit 18 illustrated in (a) in FIG. 32, as illustrated in (b) in FIG. 32, the display device 3 displays the icon 184 that represents the newly installed application such that the icon 184 does not overlap with the TV video of the TV screen 181*a*.

In the display unit 18, the plane of the TV video is different from the plane of the icon folder, and the plane of the TV video is present in the foremost plane. That is, the display device 3 performs display by using plural planes and displays the TV video on a higher-level plane than the plane for displaying the icon folder. Consequently, the display device 3 preferentially displays the TV video in a case where the TV video overlaps with the icon folder.

Meanwhile, because the icon 184 represents the application that is newly installed by the user, the whole icon 184 is desirably displayed. In order to display the whole icon 184, the display device 3 preferably adjusts the display position of the icon 184 such that the icon 184 does not overlap with the TV video of the TV screen 181*a*.

Next, display control in which the display device 3 causes a transition from the display state in (a) in FIG. 32 to the display state in (b) in FIG. 32 in the display unit 18 will be described in detail with reference to FIG. 29 and FIG. 32.

First, the user newly installs an application in the display device 3 in the display state of the display unit 18, which is illustrated in (a) in FIG. 32. In this case, the home application execution unit 33 executes installation of the application and generates the image of the icon 184 that represents the application when the installation finishes. Next, the home application execution unit 33 acquires a display range (for example, the coordinates of four apexes, the coordinates of one apex and the vertical and horizontal lengths, or the like) of the TV screen 181*a* from the memory 17 or the TV application execution unit 32.

Then, the home application execution unit 33 adjusts the display position of the icon 184 based on the acquired display range of the TV screen 181*a* and the display size (for example, the vertical and horizontal lengths of a rectangle) of the icon 184 such that the icon 184 does not overlap with the TV video of the TV screen 181*a*. In addition, the home application execution unit 33 supplies data of the home screen that includes the image of the icon 184 which is adjusted to the display position to the display processing unit 34.

The display processing unit 34 accepts supply of the data of the home screen from the home application execution unit 33 and instructs the display unit 18 to display the home screen.

The display unit 18 accepts a display instruction of the home screen from the display processing unit 34 and performs display of the home screen.

Based on the above, in a case where an application is newly installed, the display device 3 adjusts the display position of the icon 184 such that the icon 184 that represents the application does not overlap with the TV video of the TV screen 181*a*. Accordingly, the whole icon 184 that is generated by new installation of the application may be displayed without interference with the TV video. Consequently, in a case where the icon is displayed together with the TV video, the icon may appropriately be displayed.

Action Example 4

Next, an action example 4 of the display device 3 according to the second embodiment of the present invention will be described.

In a case where the user touches the display unit 18 (screen) to perform an operation and the part (starting point) which is first touched by the user is the TV video, the subsequent operation target becomes the TV. Meanwhile, in a case where the part (starting point) which is first touched by the user is another part than the TV video, the subsequent operation target becomes the application that is represented by the touched icon. Consequently, the target of an operation is not suddenly switched in the middle of movement of the TV video or the icon by a drag by the user.

Additional Matters of Second Embodiment

A configuration in which the configuration described in the second embodiment is combined with the first embodiment is included in the invention described herein.

Further, the additional matters of the first embodiment are applied to this embodiment.

[Examples of Realization by Software]

The control units 11 and 31 of the display devices 1 and 3 (particularly, the TV application execution units 12 and 32 and the home application execution units 13 and 33) may be realized by logic circuits (hardware) that are formed on an integrated circuit (IC chip) or the like or may be realized by software by using a central processing unit (CPU).

In the latter case, the display device 1 includes a CPU that executes orders of programs, which are software for realizing functions, a read only memory (ROM) or a storage device (which will be referred to as "recording medium") in which the above programs and various data are recorded such that those are readable by a computer (or a CPU), a random access memory (RAM) on which the programs are expanded, and so forth. Further, the computer (or the CPU) reads out the above programs from the above recording medium and executes those, and an object of the present invention is thereby achieved. As the above recoding medium, "non-transitory tangible medium", for example, a tape, a disk, a card, a semiconductor memory, a programmable logic circuit, or the like may be used. Further, the above programs may be supplied to the above computer via an arbitrary transmission medium that is capable of transmitting the programs (such as a communication network or a broadcast wave). Note that the present invention may be realized by a form of data signals embedded in a carrier in which the above programs are shaped by electronic transmission.

[Conclusion 1]

A display device 1 according to a first aspect of the present invention is a display device 1 that displays one or plural objects on a slidable background, in which switching is feasible between a first mode in which display of a target object among the one or plural objects is stopped in a case where the background is slid and a second mode in which the target object is displayed while being fixed to a display region regardless of whether or not the background is slid.

In the above configuration, the first mode is the display mode that is preferable for a case where the user desires to focus on viewing and listening to the target object, and the second mode is the display mode that is preferable for a case where the user desires to view and listen to the target object while viewing and listening to another object. Because those two display modes are switchable at a desired timing by the user, switching may easily be performed to the display mode that corresponds to a viewing-and-listening style desired by a user.

As for the display device 1 according to a second aspect of the present invention, in the above first aspect, in a case where in the first mode, an operation for moving the target object is accepted, switching is performed from the first mode to the second mode.

In the above configuration, switching from the first mode to the second mode may be performed only by holding down the target object. In such a manner, in the display device 1 according to one aspect of the present invention, the user may perform mode switching by an easy action.

As for the display device 1 according to a third aspect of the present invention, in the above first or second aspect, in a case where in the second mode, an operation for moving the target object into a prescribed region in the background is accepted, switching is performed from the second mode to the first mode.

In the above configuration, switching from the second mode to the first mode may be performed only by moving the target object into the prescribed region. In such a manner, in the display device 1 according to one aspect of the present invention, the user may perform mode switching by an easy action.

As for the display device 1 according to a fourth aspect of the present invention, in any one of the above first to third aspects, in a case where an operation for displaying the background is accepted during execution of an application by full screen display, display of the target object is performed in the mode in which display is performed before the execution of the application between the first mode and the second mode.

In the above configuration, even in a case where the application is finished, the display mode at a time before the execution of the application may be maintained.

As for the display device 1 according to a fifth aspect of the present invention, in any one of the above first to fourth aspects, in a case where in the first mode, the target object is selected, full screen display of the target object is performed. Further, as for the display device 1 according to a sixth aspect of the present invention, in any one of the above first to fifth aspects, in a case where in the second mode, the target object is selected, an object for operating the target object is displayed.

In the above configuration, the action in a case where the target object is selected may be changed in response to the display mode.

As for the display device 1 according to a seventh aspect of the present invention, in any one of the above first to sixth aspects, in a case where in the first mode, an operation for expanding or enlarging any of the one or plural objects is accepted and at least a portion of the expanded or enlarged object is superimposed on at least a portion of the target object, display of the target object is stopped.

In the above configuration, even in a case where the expanded or enlarged object is superimposed on the target object, the expanded or enlarged object may be viewed with no problem.

As for the display device 1 according to an eighth aspect of the present invention, in any one of the above first to seventh aspect, in a case where in the second mode, the operation for expanding or enlarging any of the one or plural objects is accepted, the target object is preferentially displayed regardless of whether or not at least a portion of the expanded or enlarged object is superimposed on at least a portion of the target object.

In the above configuration, because the target object may be moved in a case where the expanded or enlarged object is superimposed on the target object, there is no problem even in a case where the target object is preferentially displayed to the expanded or enlarged object.

As for the display device 1 according to a ninth aspect of the present invention, in any one of the above first to eighth aspects, in a case where in the first mode, in order to move any of the one or plural objects, an operation for moving the object is accepted, display of the target object is stopped.

In the above configuration, even in a case where the object that is moving is superimposed on the target object, the object that is moving may be viewed with no problem.

As for the display device 1 according to a tenth aspect of the present invention, in any one of the above first to ninth aspects, in a case where in the second mode, in order to move any of the one or plural objects, the operation for moving the object is accepted, the target object is preferentially displayed.

In the above configuration, because the target object may be moved in a case where the object is superimposed on the target object during movement of the object, there is no problem even in a case where the target object is preferentially displayed to the object that is moving.

As for the display device 1 according to an eleventh aspect of the present invention, in any one of the above first to tenth aspects, in a case where in the first mode, an operation for starting an application by full screen display is accepted, full screen display of the application is performed, and display of the target object is stopped.

The above configuration is preferable in a case where the user desires to focus on use of the application because only the application is displayed in a case where the application is started.

As for the display device 1 according to a twelfth aspect of the present invention, in any one of the above first to eleventh aspects, in a case where in the second mode, the operation for starting an application by full screen display is accepted, full screen display of the application is performed, and the target object is displayed while being fixed to a display region.

The above configuration is preferable in a case where the user desires to view and listen to the target object while using the application because the target object is displayed together even in a case where the application is started.

As for the display device 1 according to a thirteenth aspect of the present invention, in any one of the above first to twelfth aspects, a menu for selecting displaying the target object in the first mode or stopping display of the target object is displayed.

In the above configuration, the user may appropriately switch presence and absence of display of the target object.

As for the display device 1 according to a fourteenth aspect of the present invention, in the above thirteenth aspect, an object that indicates a position of the presently displayed background is changed in response to selection in the menu.

In the above configuration, presence or absence of display of the target object may be recognized only by seeing the object that indicates the position of the presently displayed background.

As for the display device 1 according to a fifteenth aspect of the present invention, in any one of the above first to fourteenth aspects, the background is configured with plural pages, a theme is set to each of the pages, and the object that is related to the set theme is arranged on each of the pages.

In the above configuration, the objects related to the themes that are set to the respective pages of the background are arranged on the respective pages, the objects arranged on the background are thereby not scattered, and those objects may be arrayed.

Further, because the pages that correspond to plural themes (for example, the daily living situations of the user at home), the display device 1 according to one aspect of the present invention may be shared by plural users. Further, because switching among accounts or the like does not have to be performed, the display device 1 may readily be shared by plural users. Further, even in a case where the display device 1 is shared by plural users, the objects arranged on the background are arranged while being categorized into the related themes and are thus not scattered.

Further, a television receiver that includes the display device of any one of the above first to fifteenth aspects is included in the extent of the present invention.

Further, the display device of any one of the first to fifteenth aspects of the present invention may be realized by a computer. In this case, a program of the display device that causes the computer to act as the above display device and thereby realizes the above display device with the computer and a computer-readable recording medium that records the program are included in the extent of the present invention.

A display method 1 according to a sixteenth aspect of the present invention is a display method of displaying one or plural objects on a slidable background, in which switching is performed between a first mode in which display of a target object among the one or plural objects is stopped in a case where the background is slid and a second mode in which the target object is displayed while being fixed to a display region regardless of whether or not the background is slid.

The above method may provide similar effects to the display device according to the first aspect of the present invention.

[Conclusion 2]

As for a display device (3) according to the sixteenth aspect of the present invention is a display device that displays the one or plural objects together with a content and that includes an acceptance unit (input acceptance unit 16) which accepts the operation for expanding or enlarging any of the one or plural object, and a control unit (31) which stops display of the content in a case where at least a portion of the expanded or enlarged object is superimposed on at least a portion of the content.

In the above configuration, in the display device, in a case where the operation for expanding or enlarging any of the one or plural objects is performed and at least a portion of the expanded or enlarged object is superimposed on at least a portion of the content, the display device stops display of the content. Accordingly, even in a case where at least a portion of or the whole expanded or enlarged object overlaps with the content, the whole object may be displayed. Consequently, the object may appropriately be displayed in a case where the object is displayed together with the content.

The display device according to a seventeenth aspect of the present invention is a display device that displays the one or plural objects together with a content, in which display of the content is stopped in a case where in order to move any target object of the one or plural objects, the operation for moving the target object is accepted.

In the above configuration, in the display device, the display device stops display of the content in a case where in order to move any target object of the one or plural objects, the operation for moving the target object is accepted. Accordingly, even in a case where the target object moves and overlaps with the display region of the content, the whole object may be displayed. Consequently, the object may appropriately be displayed in a case where the object is displayed together with the content.

The display device according to an eighteenth aspect of the present invention is a display device that displays the one or plural objects together with a content and that includes an adjustment unit (home application execution unit 33) which adjusts a display position of a target object such that the target object which represents an application which is newly installed does not overlap with the content.

In the above configuration, in a case where an application is newly installed, the display device adjusts the display position of the target object such that the target object that represents the application does not overlap with the content. Accordingly, the whole object that is generated by new installation of the application may be displayed without interference with the content. Consequently, the object may appropriately be displayed in a case where the object is displayed together with the content.

The display device according to a nineteenth aspect of the present invention, in the above sixteenth to eighteenth aspects, the display device may perform display by using plural planes, and the content may be displayed on a higher-level plane than a plane on which the one or plural objects are displayed.

In the above configuration, because the plane for displaying the content is present on a higher-level plane than the plane for displaying the one or plural objects, the display device may basically display the content in preference to the object. Note that the display device stops display of the content and may thereby display the object preferentially.

A television receiver according to a twentieth aspect of the present invention includes the display device in the above sixteenth to nineteenth aspects.

The display device according to each of the aspects of the present invention may be realized by a computer. In this case, a program of the display device that causes the computer to act as measures included in the above display device and thereby realizes the above display device with the computer and a computer-readable recording medium that records the program are included in the extent of the present invention.

The present invention is not limited to the above-described embodiments. Various kinds of modifications are possible in the scope described in claims, and embodiments that are obtained by appropriately combining technical measures disclosed in the different embodiments are included in the technical scope of the present invention. In addition, new technical features may be formed by combining technical measures that are disclosed in the embodiments.

REFERENCE SIGNS LIST 1 display device
3 display device
11 control unit
12 TV application execution unit
13 home application execution unit
14 display processing unit
15 touch detection unit
16 input acceptance unit (acceptance unit)
18 display unit
181a, 181b TV screen
182a, 182b icon folder (object)
183, 184 icon (object)
31 control unit
32 TV application execution unit
33 home application execution unit (adjustment unit)
34 display processing unit
35 touch detection unit
50 mini-TV
55 prescribed section
65 prescribed region

The invention claimed is:

1. A display device that displays one or plural objects on a plurality of background pages, the display device comprising:
control circuitry that performs switching between a first mode in which display of a target object among the one or plural objects is stopped in a case where one of the plurality of background pages is slid to an adjacent one of the plurality of background pages, the target object being a moving image content, and a second mode in which the target object is displayed while being fixed to a display region regardless of whether or not the one of the plurality of background pages is slid to the adjacent one of the plurality of background pages.

2. The display device according to claim 1, wherein in a case where in the first mode, an operation for moving the target object is accepted, switching is performed from the first mode to the second mode.

3. The display device according to claim 1, wherein in a case where in the second mode, an operation for moving the target object into a prescribed region in the one of the plurality of background pages of the adjacent one of the plurality of background pages is accepted, switching is performed from the second mode to the first mode.

4. The display device according to claim 1, wherein in a case where an operation for displaying the one of the plurality of background pages is accepted during execution of an application by full screen display, display of the target object is performed in one of the first mode and the second mode in which one display is performed before the execution of the application.

5. The display device according to claim 1, wherein in a case where in the first mode, the target object is selected, full screen display of the target object is performed.

6. The display device according to claim 1, wherein in a case where in the second mode, the target object is selected, an object for operating the target object is displayed.

7. The display device according to claim 1, further comprising acceptance circuitry that accepts an operation for expanding or enlarging any of the one or plural objects, wherein
in a case where in the first mode, an operation for expanding or enlarging any of the one or plural objects is accepted and at least a portion of the expanded or enlarged object is superimposed on at least a portion of the target object, display of the target object is stopped.

8. The display device according to claim 1, wherein in a case where in the second mode, an operation for expanding or enlarging any of the one or plural objects is accepted, the target object is preferentially displayed regardless of whether or not at least a portion of the expanded or enlarged object is superimposed on at least a portion of the target object.

9. The display device according to claim 1, wherein in a case where in the first mode, in order to move any of the one or plural objects, an operation for moving the object is accepted, display of the target object is stopped.

10. The display device according to claim 1, wherein in a case where in the second mode, in order to move any of the one or plural objects, an operation for moving the object is accepted, the target object is preferentially displayed.

11. The display device according to claim 1, wherein in a case where in the first mode, an operation for starting an application by full screen display is accepted, full screen display of the application is performed, and display of the target object is stopped.

12. The display device according to claim 1, wherein in a case where in the second mode, an operation for starting an application by full screen display is accepted, full screen display of the application is performed, and the target object is displayed while being fixed to a display region.

13. The display device according to claim 1, wherein a menu for selecting displaying the target object in the first mode or stopping display of the target object is displayed.

14. The display device according to claim 13, wherein an object that indicates a position of the presently displayed background page of the plurality of background pages is changed in response to selection in the menu.

15. The display device according to claim 1, wherein a theme is set to each of the plurality of background pages, and an object that is related to the set theme is arranged on each of the pages.

16. The display device according to claim 1, wherein the display device displays the one or plural objects together with a content, and
the display device further includes
acceptance circuitry that accepts an operation for expanding or enlarging any of the one or plural object, and
a control unit that stops display of the content in a case where at least a portion of the expanded or enlarged object is superimposed on at least a portion of the content.

17. The display device according to claim 1, wherein
the display device displays the one or plural objects together with a content, and
display of the content is stopped in a case where in order to move any target object of the one or plural objects, an operation for moving the any target object is accepted.

18. The display device according to claim 1, wherein
the display device further includes adjustment circuitry that adjusts a display position of another target object that represents an application which is newly installed, such that the another target object, which represents the application that is newly installed, does not overlap with the content.

19. The display device according to claim 16, wherein
the display device performs display by using plural planes, and
the content is displayed on a higher-level plane than a plane on which the one or plural objects are displayed.

20. A non-transitory computer-readable recording medium that records a program that causes a computer to function as a display device that displays one or plural objects on a plurality of background pages, the display device including:
control circuitry that performs switching between a first mode in which display of a target object among the one or plural objects is stopped in a case where one of the plurality of background pages is slid to an adjacent one of the plurality of background pages, the target object being a moving image content, and a second mode in which the target object is displayed while being fixed to a display region regardless of whether or not the one of the plurality of background pages is slid to the adjacent one of the plurality of background pages.

21. A display method of displaying one or plural objects on a plurality of background pages, the method comprising:
performing switching between a first mode in which display of a target object among the one or plural objects is stopped in a case where one of the plurality of background pages is slid to an adjacent one of the plurality of background pages, the target object being a moving image content, and a second mode in which the target object is displayed while being fixed to a display region regardless of whether or not the one of the plurality of background pages is slid to the adjacent one of the plurality of background pages.

* * * * *